US012738106B2

(12) United States Patent
Uehara et al.

(10) Patent No.: US 12,738,106 B2
(45) Date of Patent: Sep. 15, 2026

(54) ELECTRONIC CONTROL UNIT AND NON-TRANSITORY COMPUTER READABLE MEDIUM STORING SESSION ESTABLISHMENT PROGRAM

(71) Applicant: DENSO CORPORATION, Kariya-city (JP)

(72) Inventors: Kazuhiro Uehara, Kariya-city (JP); Yuzo Harata, Kariya-city (JP); Mitsuyoshi Natsume, Kariya-city (JP); Takuya Kawasaki, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 89 days.

(21) Appl. No.: 18/799,010

(22) Filed: Aug. 9, 2024

(65) Prior Publication Data

US 2024/0404332 A1 Dec. 5, 2024

Related U.S. Application Data

(60) Division of application No. 17/096,857, filed on Nov. 12, 2020, now Pat. No. 12,087,103, which is a (Continued)

(30) Foreign Application Priority Data

May 15, 2018 (JP) ................................ 2018-093867
May 13, 2019 (JP) ................................ 2019-090618

(51) Int. Cl.

| | |
|---|---|
| ***G07C 5/08*** | (2006.01) |
| ***G06F 8/65*** | (2018.01) |
| ***G06F 8/654*** | (2018.01) |

(52) U.S. Cl.

CPC .......... *G07C 5/0808* (2013.01); *G06F 8/654* (2018.02); *G06F 8/66* (2013.01)

(58) Field of Classification Search

CPC ... G07C 5/0808; G07C 2205/02; G06F 8/654; G06F 8/66; G06F 8/656

(Continued)

(56) References Cited

U.S. PATENT DOCUMENTS

| | | | | |
|---|---|---|---|---|
| 2004/0249526 A1* | 12/2004 | Hauer | G08C 17/00 701/32.7 |
| 2011/0035096 A1* | 2/2011 | Liebl | G07C 5/0808 701/33.4 |

(Continued)

FOREIGN PATENT DOCUMENTS

| | | |
|---|---|---|
| CN | 104881020 A | 9/2015 |
| CN | 103688518 B | 6/2016 |

(Continued)

OTHER PUBLICATIONS

U.S. Appl. No. 17/096,857, filed Nov. 12, 2020, Kazuhiro Uehara.

*Primary Examiner* — Krishnan Ramesh
(74) *Attorney, Agent, or Firm* — Harness, Dickey & Pierce, P.L.C.

(57) ABSTRACT

An electronic control unit diagnoses the electronic control unit via wired connection or wireless from an outside of a vehicle and rewrites the electronic control unit via the wire or the wireless from the outside of the vehicle, based on a program acquired from the outside of the vehicle via the wire or the wireless.

15 Claims, 20 Drawing Sheets

Related U.S. Application Data continuation of application No. PCT/JP2019/019118, filed on May 14, 2019.

(58) Field of Classification Search
USPC ........................................................ 701/33.2
See application file for complete search history.

(56) References Cited

U.S. PATENT DOCUMENTS

2011/0083161 A1* 4/2011 Ishida .................. G06F 21/572 726/2
2012/0110296 A1 5/2012 Harata
2012/0239246 A1 9/2012 Tanaka et al.
2012/0320927 A1 12/2012 Katou et al.
2013/0031212 A1 1/2013 Enosaki et al.
2013/0054082 A1* 2/2013 Costantino ......... G05B 23/0272 701/29.6
2013/0081106 A1 3/2013 Harata et al.
2013/0173112 A1 7/2013 Takahashi et al.
2013/0219170 A1 8/2013 Naitou et al.
2014/0012458 A1* 1/2014 Park ........................ G06F 17/00 701/31.4
2014/0180531 A1* 6/2014 Lipscomb ............. G07C 5/008 701/33.2
2014/0277925 A1 9/2014 Tanaka et al.
2014/0317729 A1 10/2014 Naitou et al.
2015/0057840 A1 2/2015 Katou et al.
2015/0133053 A1 5/2015 Li et al.
2015/0254909 A1 9/2015 Harata et al.
2015/0281022 A1 10/2015 Harata et al.
2015/0310675 A1* 10/2015 Park ...................... G07C 5/008 701/31.5
2015/0310677 A1* 10/2015 Shin ..................... G07C 5/0808 701/29.1
2016/0171802 A1* 6/2016 Fountain .................. G07C 5/08 701/31.4
2016/0288744 A1 10/2016 Rutherford et al.
2016/0318522 A1 11/2016 Tanaka et al.
2017/0200134 A1* 7/2017 Wilson .................. B60W 50/02
2018/0203685 A1 7/2018 Nakamura et al.
2019/0108014 A1 4/2019 Nakamura et al.
2019/0111907 A1 4/2019 Harata et al.
2019/0266017 A1 8/2019 Nakamura et al.
2019/0287626 A1 9/2019 Kawasaki et al.
2020/0216083 A1 7/2020 Kawasaki et al.
2021/0065478 A1* 3/2021 Uehara .................. G07C 5/008
2021/0157902 A1* 5/2021 Sakurai ................... G06F 9/445

FOREIGN PATENT DOCUMENTS

DE 102017124013 A1 5/2018
JP 2007-241634 A 9/2007
JP 2007240436 A 9/2007
JP 2007241364 A 9/2007
JP 5152297 B2 2/2013
JP 5375905 B2 12/2013
JP 5423736 B2 2/2014
JP 5423754 B2 2/2014
JP 5435022 B2 3/2014
JP 5454517 B2 3/2014
JP 201478800 A 5/2014
JP 2014088150 A 5/2014
JP 2014118071 A 6/2014
JP 5556824 B2 7/2014
JP 2014201085 A 10/2014
JP 5783103 B2 9/2015
JP 5838898 B2 1/2016
JP 2016015020 A 1/2016
JP 2016032274 A 3/2016
JP 5900007 B2 4/2016
JP 2017028523 A 2/2017
JP 2017114156 A 6/2017
JP 2017150999 A 8/2017
JP 2017220091 A 12/2017
JP 2017220092 A 12/2017
JP 2018013837 A 1/2018
JP 2018065410 A 4/2018
JP 2018092577 A 6/2018
JP 2018097571 A 6/2018
JP 2019066181 A 4/2019
WO WO-2013168499 A1 11/2013

* cited by examiner 1
3
5
6
7
8
9
10
MANAGEMENT SERVER
WEB SERVER
FILE SERVER
MOBILE TERMINAL
IN-VEHICLE DISPLAY
2
DCM
12
14
11
13
CGW
15
16
17
18
BODY TYPE ECU
19
TRAVELING TYPE ECU
20
MM TYPE ECU
21
POWER SUPPLY MANAGEMENT ECU
22
4
DL CONNECTER
TOOL
23
24
25

FIG. 6

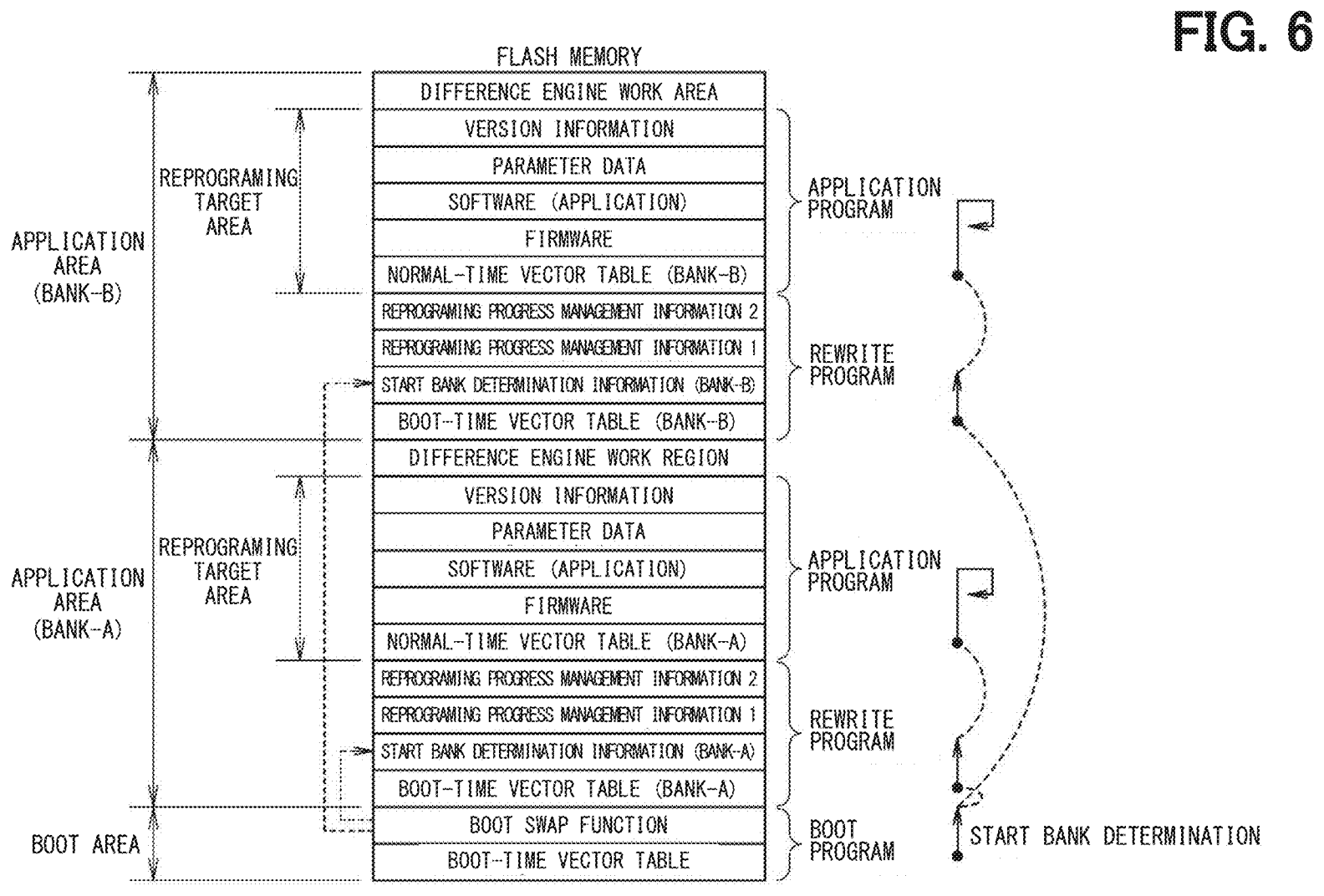

FLASH MEMORY
DIFFERENCE ENGINE WORK AREA
VERSION INFORMATION
PARAMETER DATA
SOFTWARE (APPLICATION)
FIRMWARE
NORMAL-TIME VECTOR TABLE (BANK-B)
REPROGRAMING PROGRESS MANAGEMENT INFORMATION 2
REPROGRAMING PROGRESS MANAGEMENT INFORMATION 1
START BANK DETERMINATION INFORMATION (BANK-B)
BOOT-TIME VECTOR TABLE (BANK-B)
DIFFERENCE ENGINE WORK REGION
VERSION INFORMATION
PARAMETER DATA
SOFTWARE (APPLICATION)
FIRMWARE
NORMAL-TIME VECTOR TABLE (BANK-A)
REPROGRAMING PROGRESS MANAGEMENT INFORMATION 2
REPROGRAMING PROGRESS MANAGEMENT INFORMATION 1
START BANK DETERMINATION INFORMATION (BANK-A)
BOOT-TIME VECTOR TABLE (BANK-A)
BOOT SWAP FUNCTION
BOOT-TIME VECTOR TABLE

APPLICATION AREA (BANK-B)
REPROGRAMING TARGET AREA
APPLICATION AREA (BANK-A)
REPROGRAMING TARGET AREA
BOOT AREA

APPLICATION PROGRAM
REWRITE PROGRAM
APPLICATION PROGRAM
REWRITE PROGRAM
BOOT PROGRAM

START BANK DETERMINATION

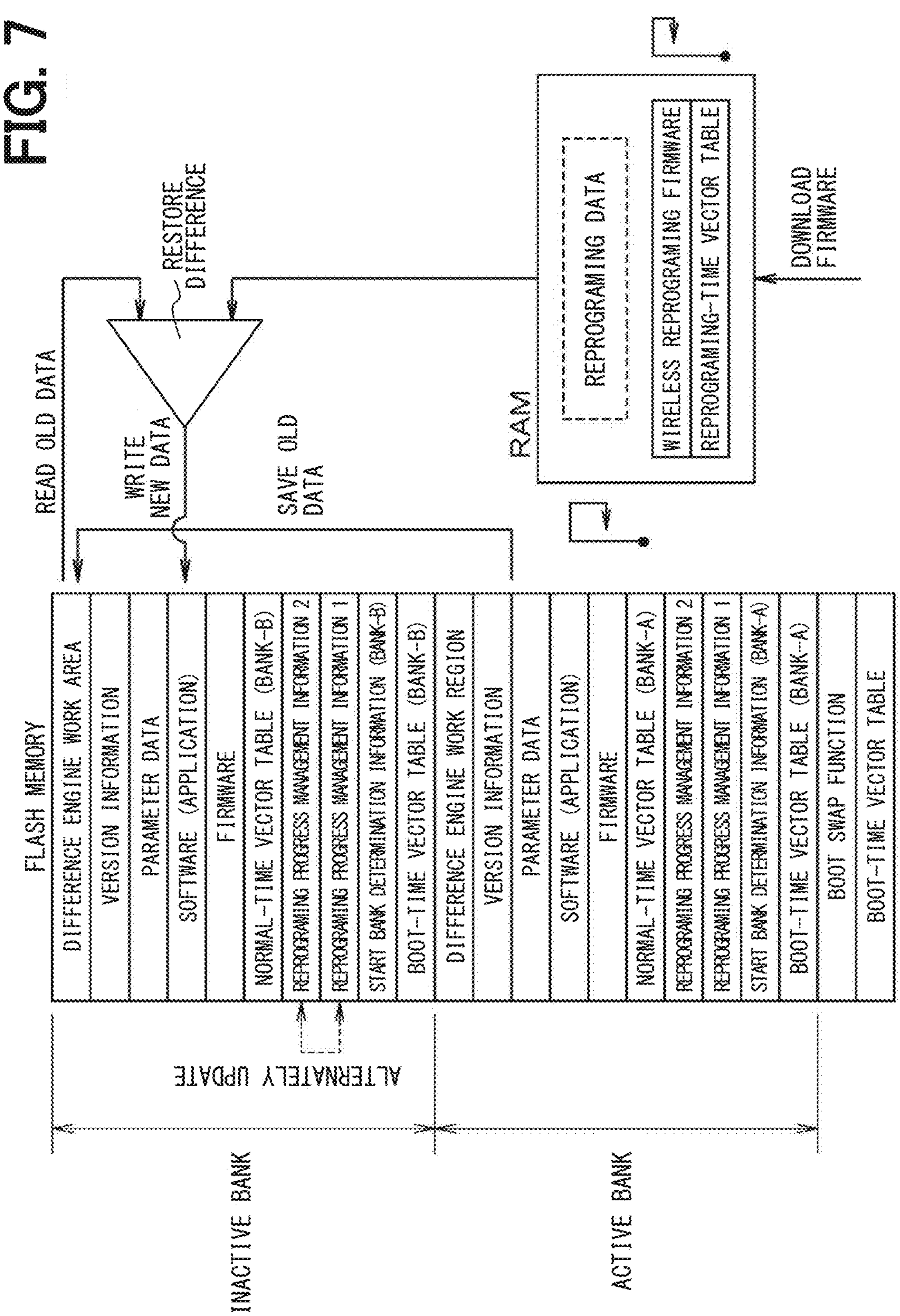
FIG. 7
FLASH MEMORY
DIFFERENCE ENGINE WORK AREA
VERSION INFORMATION
PARAMETER DATA
SOFTWARE (APPLICATION)
FIRMWARE
NORMAL-TIME VECTOR TABLE (BANK-B)
REPROGRAMING PROGRESS MANAGEMENT INFORMATION 2
REPROGRAMING PROGRESS MANAGEMENT INFORMATION 1
START BANK DETERMINATION INFORMATION (BANK-B)
BOOT-TIME VECTOR TABLE (BANK-B)
DIFFERENCE ENGINE WORK REGION
VERSION INFORMATION
PARAMETER DATA
SOFTWARE (APPLICATION)
FIRMWARE
NORMAL-TIME VECTOR TABLE (BANK-A)
REPROGRAMING PROGRESS MANAGEMENT INFORMATION 2
REPROGRAMING PROGRESS MANAGEMENT INFORMATION 1
START BANK DETERMINATION INFORMATION (BANK-A)
BOOT-TIME VECTOR TABLE (BANK-A)
BOOT SWAP FUNCTION
BOOT-TIME VECTOR TABLE
ALTERNATELY UPDATE
INACTIVE BANK
ACTIVE BANK
READ OLD DATA
WRITE NEW DATA
SAVE OLD DATA
RESTORE DIFFERENCE
RAM
REPROGRAMING DATA
WIRELESS REPROGRAMING FIRMWARE
REPROGRAMING-TIME VECTOR TABLE
DOWNLOAD FIRMWARE FIG. 10
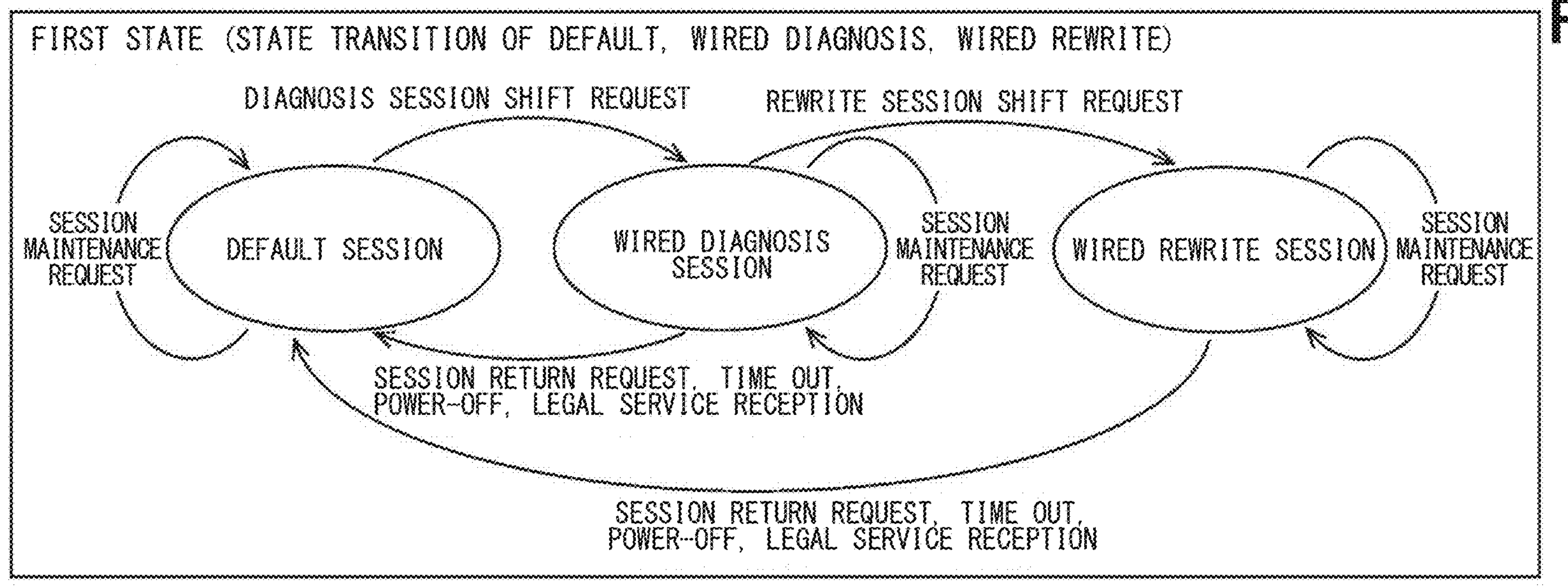
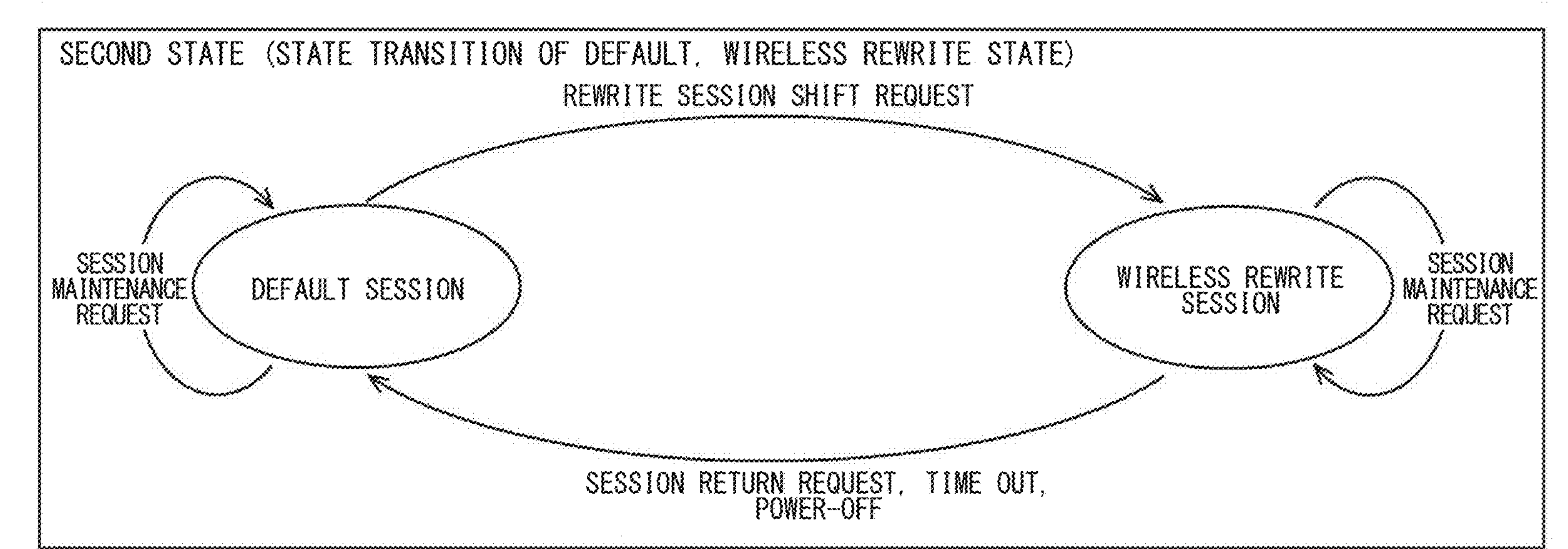

FIG. 11
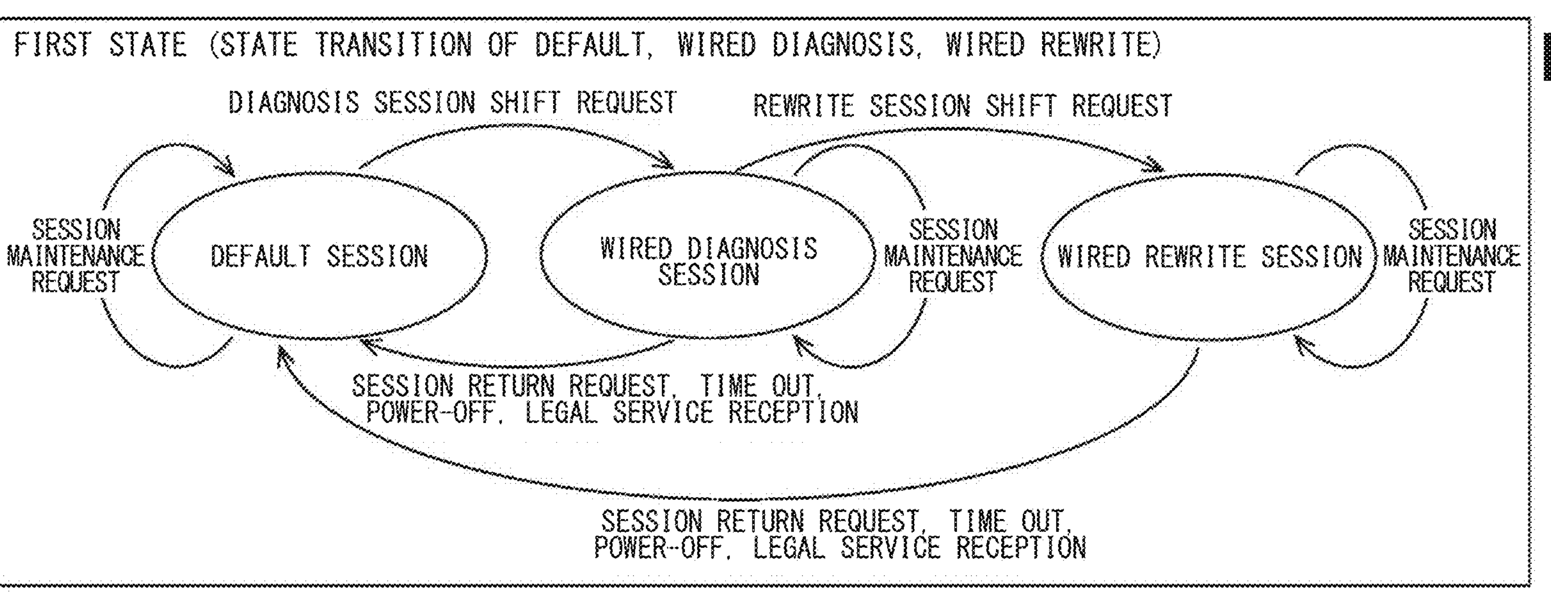
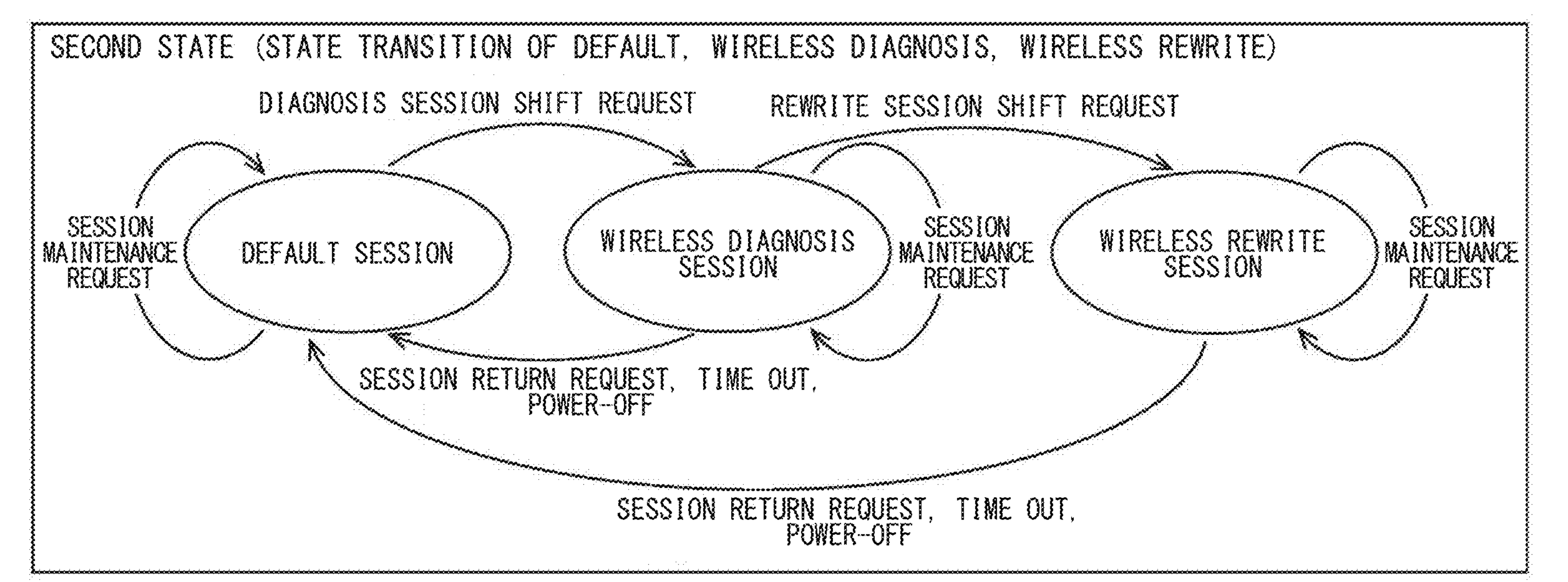

FIG. 13

| SECOND STATE \ FIRST STATE | DEFAULT SESSION | WIRED DIAGNOSIS SESSION | WIRED REWRITE SESSION |
|---|---|---|---|
| DEFAULT SESSION | ○ VEHICLE CONTROL | ○ WIRED DIAGNOSIS<br>○ VEHICLE CONTROL | ○ WIRED REWRITE<br>× VEHICLE CONTROL |
| WIRELESS DIAGNOSIS SESSION | ○ WIRELESS DIAGNOSIS<br>○ VEHICLE CONTROL | ○ WIRED DIAGNOSIS<br>○ WIRELESS DIAGNOSIS<br>○ VEHICLE CONTROL | ○ WIRED REWRITE<br>× WIRELESS DIAGNOSIS<br>× VEHICLE CONTROL |
| WIRELESS REWRITE SESSION | ○ WIRELESS REWRITE<br>○ VEHICLE CONTROL | ○ WIRELESS REWRITE<br>○ WIRED DIAGNOSIS<br>○ VEHICLE CONTROL | ○ WIRED REWRITE<br>× WIRELESS REWRITE (IN CASE OF PRIORITIZING WIRED REWRITE)<br>× VEHICLE CONTROL |

○: EXECUTABLE
×: NON-EXECUTABLE

FIG. 14

| SECOND STATE \ FIRST STATE | DEFAULT SESSION | WIRED DIAGNOSIS SESSION | WIRED REWRITE SESSION |
|---|---|---|---|
| DEFAULT SESSION | ○ VEHICLE CONTROL | ○ WIRED DIAGNOSIS<br>○ VEHICLE CONTROL | ○ WIRED REWRITE<br>○ VEHICLE CONTROL |
| WIRELESS DIAGNOSIS SESSION | ○ WIRELESS DIAGNOSIS<br>○ VEHICLE CONTROL | ○ WIRED DIAGNOSIS<br>○ WIRELESS DIAGNOSIS<br>○ VEHICLE CONTROL | ○ WIRED REWRITE<br>○ WIRELESS DIAGNOSIS<br>○ VEHICLE CONTROL |
| WIRELESS REWRITE SESSION | ○ WIRELESS REWRITE<br>○ VEHICLE CONTROL | ○ WIRELESS REWRITE<br>○ WIRED DIAGNOSIS<br>○ VEHICLE CONTROL | ○ WIRED REWRITE<br>× WIRELESS REWRITE (IN CASE OF PRIORITIZING WIRED REWRITE)<br>○ VEHICLE CONTROL |

○: EXECUTABLE
×: NON-EXECUTABLE

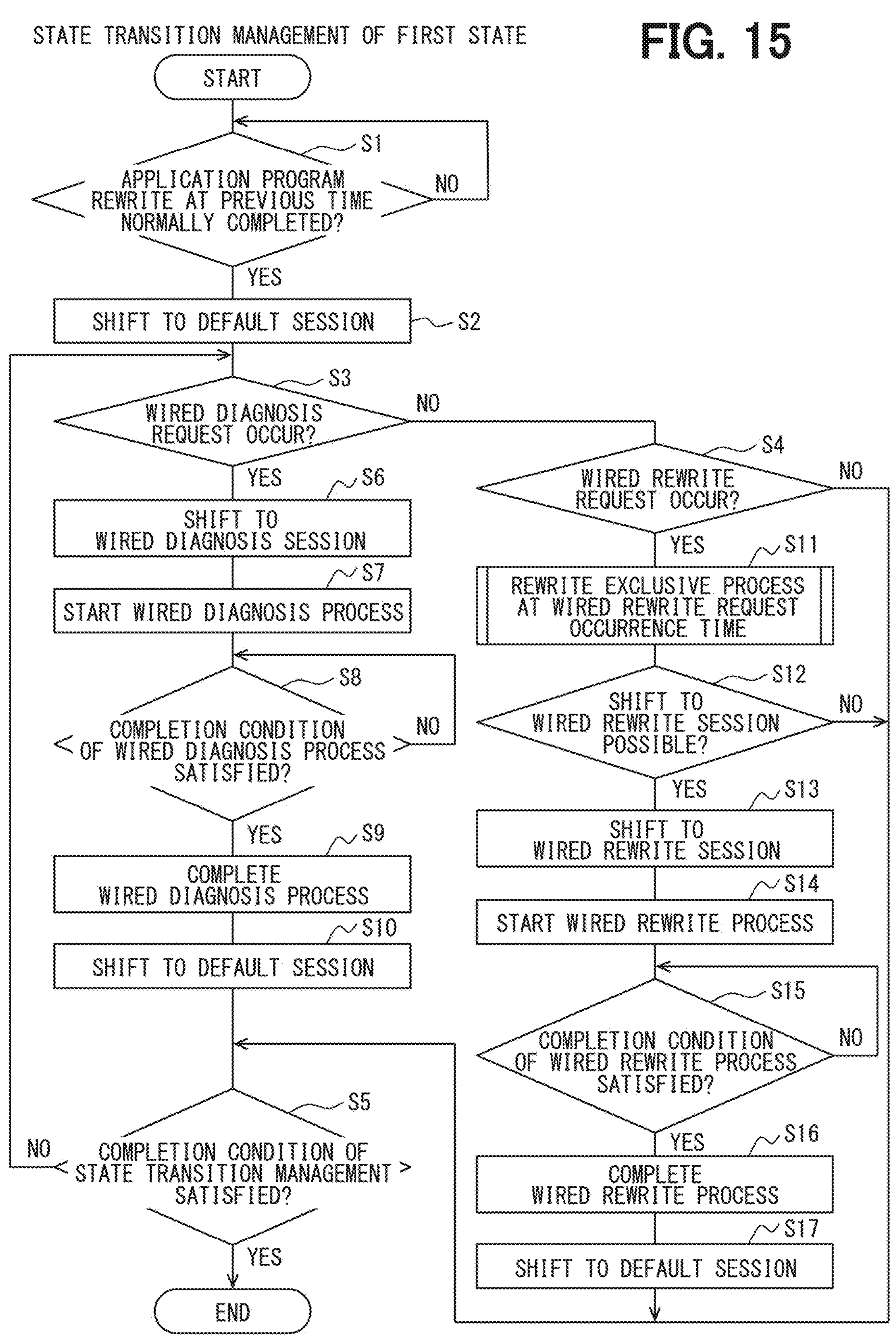
STATE TRANSITION MANAGEMENT OF FIRST STATE
FIG. 15
START
S1
APPLICATION PROGRAM REWRITE AT PREVIOUS TIME NORMALLY COMPLETED?
NO
YES
SHIFT TO DEFAULT SESSION
S2
S3
WIRED DIAGNOSIS REQUEST OCCUR?
NO
YES
S6
SHIFT TO WIRED DIAGNOSIS SESSION
S7
START WIRED DIAGNOSIS PROCESS
S8
COMPLETION CONDITION OF WIRED DIAGNOSIS PROCESS SATISFIED?
NO
YES
S9
COMPLETE WIRED DIAGNOSIS PROCESS
S10
SHIFT TO DEFAULT SESSION
S5
NO
COMPLETION CONDITION OF STATE TRANSITION MANAGEMENT SATISFIED?
YES
END
S4
WIRED REWRITE REQUEST OCCUR?
NO
YES
S11
REWRITE EXCLUSIVE PROCESS AT WIRED REWRITE REQUEST OCCURRENCE TIME
S12
SHIFT TO WIRED REWRITE SESSION POSSIBLE?
NO
YES
S13
SHIFT TO WIRED REWRITE SESSION
S14
START WIRED REWRITE PROCESS
S15
COMPLETION CONDITION OF WIRED REWRITE PROCESS SATISFIED?
NO
YES
S16
COMPLETE WIRED REWRITE PROCESS
S17
SHIFT TO DEFAULT SESSION

Figure 20:
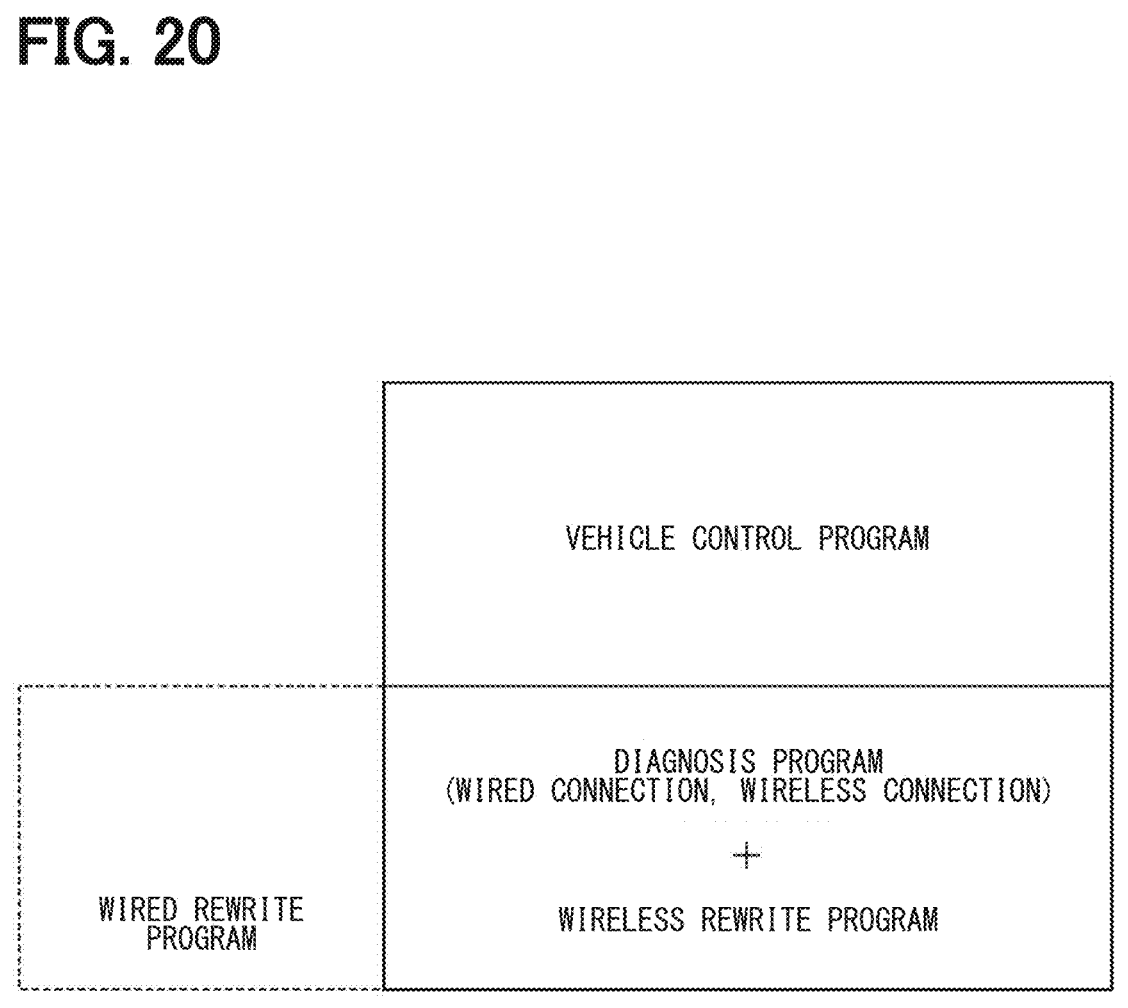

VEHICLE CONTROL PROGRAM

WIRED REWRITE PROGRAM

DIAGNOSIS PROGRAM (WIRED CONNECTION, WIRELESS CONNECTION)
+
WIRELESS REWRITE PROGRAM

ELECTRONIC CONTROL UNIT AND NON-TRANSITORY COMPUTER READABLE MEDIUM STORING SESSION ESTABLISHMENT PROGRAM

CROSS REFERENCE TO RELATED APPLICATIONS

The present application is a divisional application of U.S. patent application Ser. No. 17/096,857 filed on Nov. 12, 2020 which is a continuation application of International Patent Application No. PCT/JP2019/019118 filed on May 14, 2019, which designated the U.S. and claims the benefit of priority from Japanese Patent Application No. 2018-093867 filed on May 15, 2018 and Japanese Patent Application No. 2019-090618 filed on May 13, 2019. The entire disclosures of all of the above applications are incorporated herein by reference.

TECHNICAL FIELD

The present disclosure relates to an electronic control unit and a session establishment program.

BACKGROUND

It has been known that a service tool is connected to a vehicle network, and an electronic control unit (hereinafter, ECU) of a vehicle is diagnosed. Further, with development of a communication network and the like, a technology of a connected car has become widespread. It has been also known that diagnosis is performed by a remote control via wireless connection communication. For example, in an arbitration technology of a comparative example, the wired diagnosis is preferentially performed by the service tool when a request for the wired diagnosis and a request for the wireless diagnosis occur. The diagnosis may be also referred to as a diag.

SUMMARY

An electronic control unit may diagnose the electronic control unit via wired connection or wireless from an outside of a vehicle and may rewrite the electronic control unit via the wire or the wireless from the outside of the vehicle, based on a program acquired from the outside of the vehicle via the wire or the wireless.

BRIEF DESCRIPTION OF DRAWINGS

The above and other features and advantages of the present disclosure will become more apparent from the following detailed description made with reference to the accompanying drawings. In the drawings:

FIG. 6 is a diagram showing a mode during the normal operation in the double-bank memory of a reprograming firmware download type;

FIG. 7 is a diagram showing a mode during the rewrite operation in the double-bank memory of a reprograming firmware download type;

FIG. 10 is a diagram (first part) showing a state transition;

FIG. 11 is a diagram (second part) showing the state transition;

FIG. 13 is a diagram (first part) showing session arbitration;

FIG. 14 is a diagram (second part) showing the session arbitration;

FIG. 15 is a flowchart (first part) showing a state transition management process of a first state;

Figure 18:
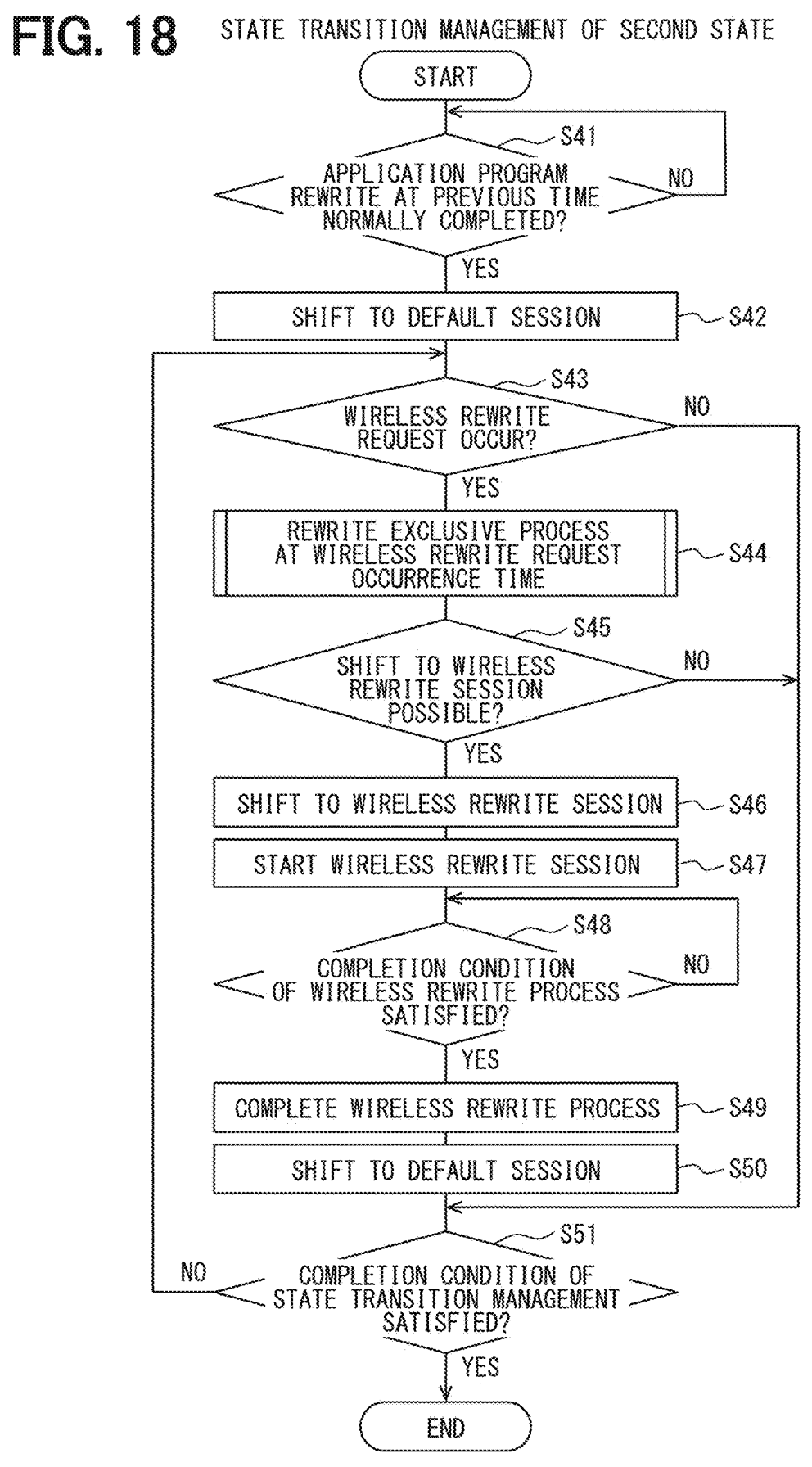

FIG. 18 is a flowchart (first part) of the state transition management process of a second state;

FIG. 20 is a diagram (second part) showing the program configuration; and

DETAILED DESCRIPTION

Figure 1:
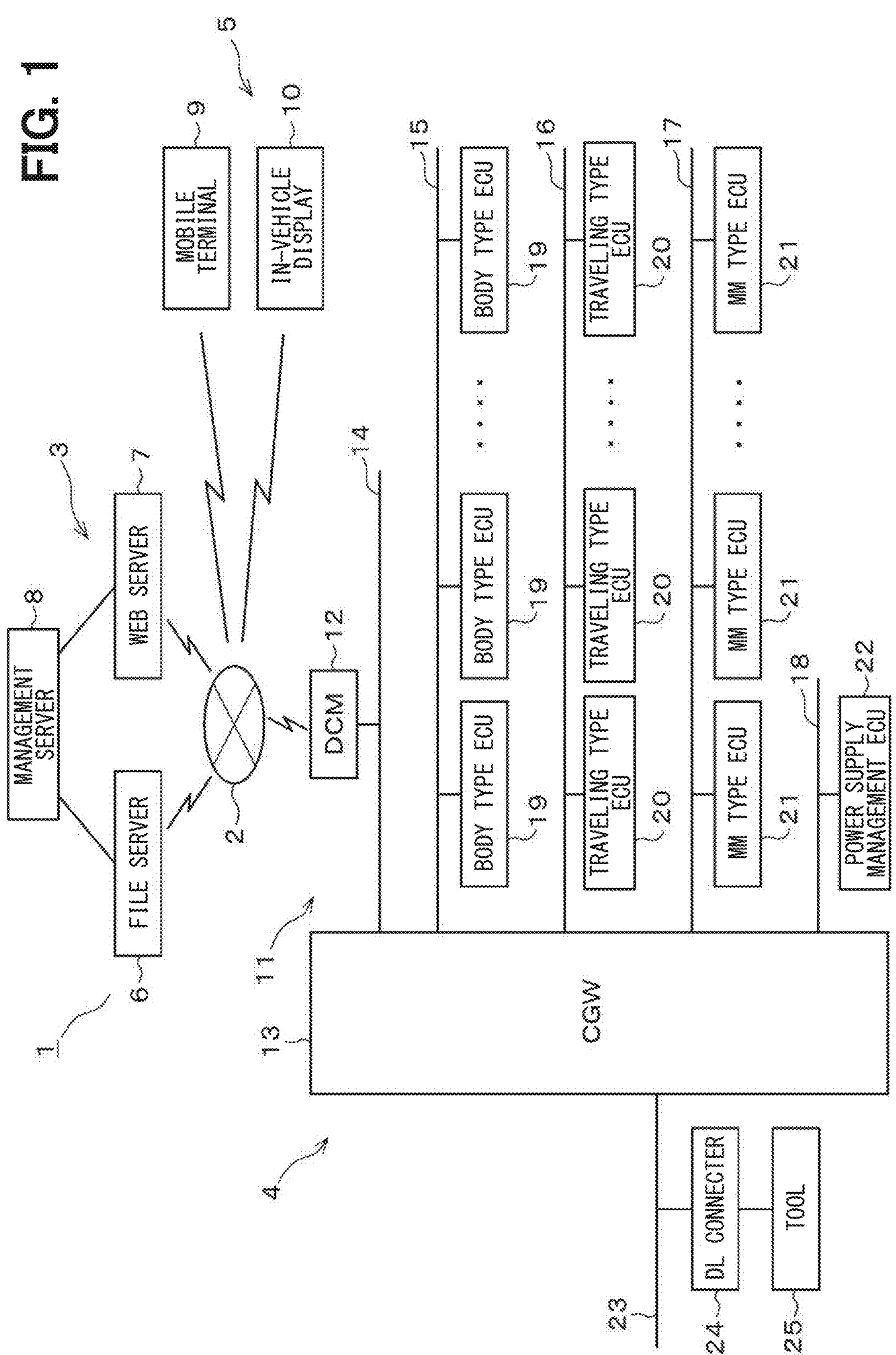
FIG. 1 is a functional block diagram showing an entire configuration according to one embodiment.

A wired request or a wireless request from an outside include not only diagnosis but also program rewriting. An ECU that is a target of the diagnosis or the program rewriting may be executing a program related to vehicle control. Under such circumstances, the ECU needs to appropriately arbitrate various requests from the outside.

One example of the present disclosure provides an electronic control unit and a session establishment program capable of appropriately arbitrating various requests from an outside.

According to one example embodiment, an application execution portion has, as a first state, a first default session, a wired diagnosis session for diagnosing the electronic control unit from an outside of a vehicle, and a wired rewrite session for rewriting the electronic control unit with use of a program acquired from the outside of the vehicle via wired connection, causes the first state to transition to the wired diagnosis session based on a request indicating a wired diagnosis, causes the first state to transition to the wired rewrite session based on a request indicating a wired rewrite, has, as a second state, a default session and a wireless rewrite session for rewriting the electronic control unit with use of a program acquired from the outside of the vehicle via wireless connection, and causes the second state to transition to the wireless rewrite session based on a request indicating a wireless rewrite. The application execution portion independently manages the first state and the second state and non-exclusively establishes the first default session or the wired diagnosis session and the wireless rewrite session.

By non-exclusively establishing the default session of the first state or the wired diagnosis session and the wireless rewrite session, it may be possible to non-exclusively execute the vehicle control or the wired diagnosis of the electronic control unit and the wireless program rewriting in accordance with the requests of the vehicle control or the wired diagnosis and the wireless program rewriting. It may be possible to appropriately arbitrate various requests from the outside.

According to another example embodiment, an application execution portion has, as a state, a default session, a diagnosis session for diagnosing the electronic control unit from an outside of the vehicle via wired connection or wireless, a wired rewrite session for rewriting the electronic control unit with use of a program acquired from the outside of the vehicle via the wire, and a wireless rewrite session for rewriting the electronic control unit with use of a program acquired from the outside of the vehicle via the wireless causes the state to transition to the diagnosis session based on a request indicating a wired diagnosis or a wireless diagnosis, causes the state to transition to the wired rewrite session based on a request indicating a wired rewrite, and causes the state to transition to the wireless rewrite session based on a request indicating a wireless rewrite. The application execution portion exclusively establishes the wired rewrite session and the wireless rewrite session.

By exclusively establishing the wired rewrite session and the wireless rewrite session, it may be possible to exclusively execute the wired program rewriting and the wireless program rewriting in accordance with the requests of the wired program rewriting and the wireless program rewriting. It may be possible to appropriately arbitrate various requests from the outside.

Hereinafter, an embodiment of the present disclosure will be described with reference to the drawings. A vehicle program rewrite system (corresponding to a vehicle electronic control system) is a system that can rewrite an application program for an ECU through OTA. The application program includes vehicle control, diagnosis, or the like. In the present embodiment, a case where the application program is rewritten by wire or wirelessly will be described. However, for example, it can be also applied to a case where data used in various applications such as map data used in a map application, a control parameter used in the ECU is rewritten by wire or wirelessly. That is, the wired rewriting of the program includes wired acquisition and wired rewriting of various data used when the program is executed, in addition to the rewriting of the ECU with use of the program acquired via wired connection from the outside of the vehicle. The wireless rewriting of the program includes wireless acquisition and wireless rewriting of various data used when the program is executed, in addition to the rewriting of the ECU with use of the program acquired wirelessly from the outside of the vehicle.

As shown in FIG. 1, a vehicle program rewrite system 1 includes a center device 3 in a side of a communication network 2, a vehicle system 4 in a side of the vehicle, and a user terminal 5. The communication network 2 includes, for example, a mobile communication network such as 4G line, an internet, a WiFi (Wireless Fidelity) (registered trademark), or the like.

The center device 3 includes a file server 6, a web server 7, and a management server 8. The servers 6 to 8 are connected so as to perform data communication with each other. The center device 3 controls an OTA function on the side of the communication network 2 in the vehicle program rewrite system 1, and functions as an OTA center. The file server 6 includes a management function of an application program distributed to the vehicle, and is a server that manages a state of reprograming data provided from a supplier that is a provider of the application program and a state of the vehicle. The file server 6 can communicate data with the vehicle system 4 via the communication network 2, and distributes the reprograming data to the vehicle system 4. The web server 7 is a server that manages web information. The web server 7 can communicate data with the user terminal 5 via the communication network 2, and transmits the web information to the user terminal 5. The management server 8 manages personal information, vehicle information, or the like.

The user terminal 5 is a mobile terminal 9 that can be carried by a user or an in-vehicle display 10 placed in a vehicle interior. The mobile terminal 9 is, for example, a smartphone, or a tablet. The in-vehicle display 10 is, for example, a display that also has a navigation function or a meter display. The user can perform various settings related to the application program rewriting and various confirmations by using the mobile terminal 9 when the user is outside the vehicle, and can perform the various settings related to the application program rewriting or the various confirmations by using the in-vehicle display 10 when the user is inside the vehicle. The vehicle system 4 includes a master device 11 (corresponding to a vehicle master device). The master device 11 has a DCM 12 and a CGW 13, and the DCM 12 and the CGW 13 are connected to communicate data with each other via a first bus 14. The DCM 12 is an in-vehicle communication device that communicates data with the center device 3 via the communication network 2, downloads the reprograming data from the file server 6, and transfers the downloaded reprograming data to the CGW 13. The CGW 13 is an in-vehicle gateway device, and distributes the reprograming data transferred from the DCM 12 to a rewrite target ECU that rewrites the application program. The master device 11 entirely controls the OTA function on the vehicle side in the vehicle program rewrite system 1, and functions as an OTA master.

In addition to the first bus 14, the CGW 13 is connected to a second bus 15, a third bus 16, a fourth bus 17, and a fifth bus 18 as buses on a vehicle interior side. The second bus 15 is, for example, a bus of a body type network bus, and connected to multiple body type ECUs 19. The multiple body type ECUs 19 include, for example, a door ECU for controlling locking/unlocking of a door, a meter ECU for controlling a meter display, an air conditioning ECU for controlling driving of an air conditioner, a window ECU for controlling opening/closing of windows, or the like. The third bus 16 is, for example, a bus of a traveling type network, and connected to multiple traveling type ECUs 20. The multiple traveling type ECUs 20 include, for example, an engine ECU for controlling driving of an engine, a brake ECU for controlling driving of a brake, an ECTECU for controlling driving of an automatic transmission, a power steering ECU for controlling driving of a power steering, or the like. The fourth bus 17 is, for example, a bus of a multimedia type network bus, and connected to multiple media type ECUs 21. The multiple multimedia type ECUs 21 include, for example, a navigation ECU for controlling a navigation system, an ETCECU for controlling an electronic toll collection system (ETC, registered trademark), or the like. The fifth bus 18 is connected to a power supply management ECU 22 that manages a power supply of the vehicle system 4.

The CGW 13 is connected to a sixth bus 23 on a vehicle exterior side. The sixth bus 23 is connected to a DLC (Data Link Coupler) connector 24. The DLC connector 24 is detachably connected to a tool 25 (corresponding to a service tool). The buses 14 to 18, and 23 are formed of, for example, CAN (Controller Area Network, registered trademark) buses. The CGW 13 communicates data with the DCM 12, the ECUs 19 to 22, and the tool 25 in accordance with a CAN data communication standard or a diagnosis communication standard (UDS: ISO14229). The buses 15 to 17 may be another type of system buses other than the body type system network bus, the traveling type system network bus, and the multimedia type system network bus. The DCM 12 and the CGW 13 may be connected by an Ethernet, or the DLC connector 24 and the CGW 13 may be connected by the Ethernet.

Upon receiving the reprograming data from the CGW 13, the rewrite target ECU writes the received reprograming data in the flash memory to rewrite the application program. In the above configuration, the CGW 13 functions as a reprograming master that distributes the reprograming data to the rewrite target ECU. The rewrite target ECU functions as a reprograming slave that writes the reprograming data received from the CGW 13 and rewrites the application program.

Modes of rewriting the application program include a mode of rewriting by wire and a mode of rewriting by wireless. The mode of rewriting the application program by wire is a mode of rewriting the rewrite target ECU by using the application program acquired from the outside of the vehicle via wired connection. Specifically, when the tool 25 is connected to the DLC connector 24, and the tool 25 transfers the reprograming data to the CGW 13. As a gateway, the CGW 13 transmits a wired rewrite request to the rewrite target ECU, and distributes the reprograming data transferred from the tool 25 to the rewrite target ECU. In the CGW 13, the distribution of the reprograming data transferred from the tool 25 to the rewrite target ECU means relaying of the reprograming data. The rewrite target ECU writes the reprograming data received from the CGW 13 and rewrites the application program.

The mode of rewriting the application program by wireless is a mode of rewriting the rewrite target ECU by using the application program acquired from the outside of the vehicle via wireless connection. Specifically, when the reprograming data is downloaded from the center device 3 to the DCM 12, the DCM 12 transfers reprograming data downloaded from the center device 3 to the CGW 13. As a gateway, the CGW 13 transmits a wireless rewrite request to the rewrite target ECU, and distributes the reprograming data transferred from the DCM 12 to the rewrite target ECU. The rewrite target ECU writes the reprograming data received from the CGW 13 and rewrites the application program.

The modes of diagnosing the ECU 19 include a mode of diagnosing by wire and a mode of diagnosing by wireless. The mode of diagnosing by wire is a mode of diagnosing the ECU 19 from the outside of the vehicle via wired connection. Specifically, when the tool 25 is connected to the DLC connector 24, and the tool 25 transfers the diagnosis request to the CGW 13. As the gateway, the CGW 13 transmits the diagnosis request to the diagnosis target ECU, and distributes a diagnosis command transferred from the tool 25 to the diagnosis target ECU. The diagnosis target ECU executes a diagnosis process in accordance with the diagnosis command received from the CGW 13.

The wireless diagnosis mode is a mode of diagnosing the ECU 19 from the outside of the vehicle via wireless connection. Specifically, when the diagnosis command is transmitted, as the diagnosis request, from the center device 3 to the DCM 12, the DCM 12 transfers the diagnosis command to the CGW 13. As the gateway, the CGW 13 distributes the diagnosis command as the diagnosis request to the diagnosis target ECU. The diagnosis target ECU executes a diagnosis process in accordance with the diagnosis command received from the CGW 13.

Figure 2:
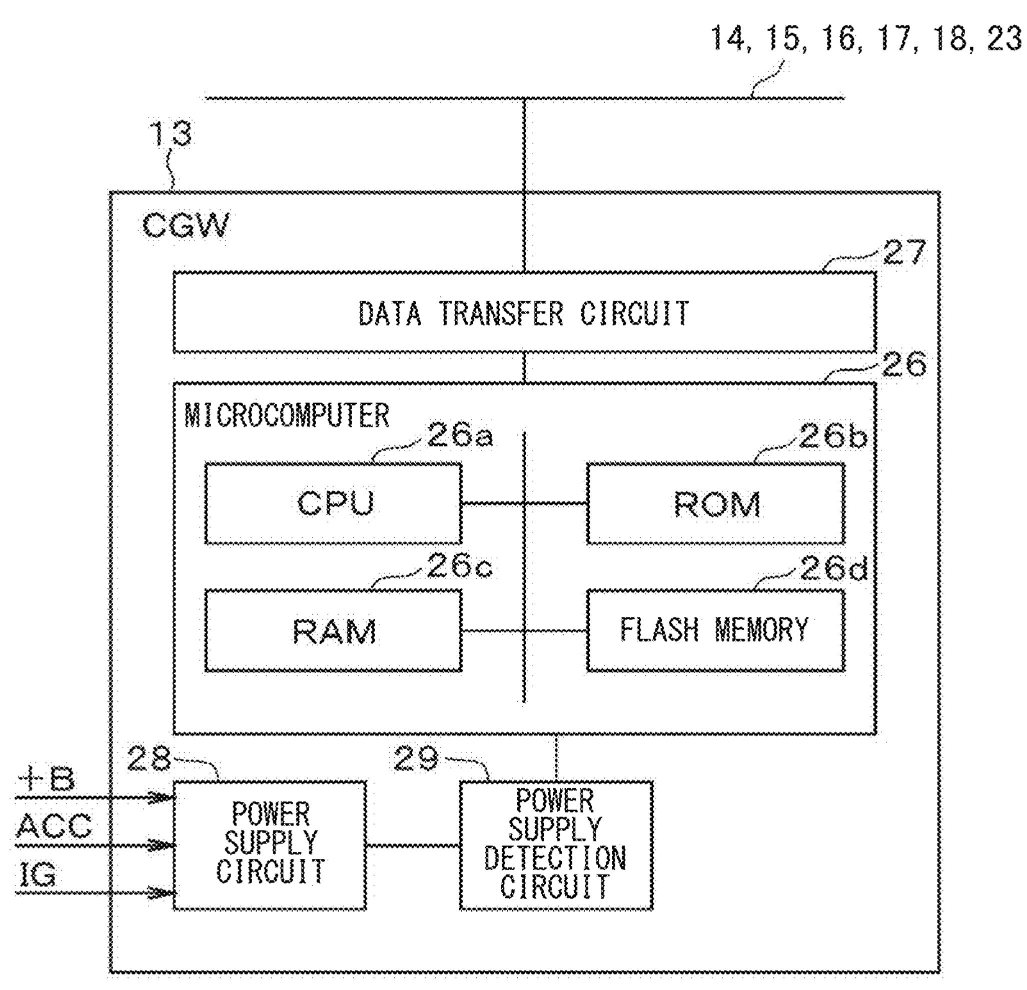
FIG. 2 is a functional block diagram showing an electrical configuration of a CGW.

As shown in FIG. 2, the CGW 13 includes a microcomputer 26, a data transfer circuit 27, a power supply circuit 28, and a power supply detection circuit 29. The microcomputer 26 includes a CPU (Central Processing Unit) 26*a*, a ROM (Read Only Memory) 26*b*, a RAM (Random Access Memory) 26*c*, a flash memory 26*d* (corresponding to a storage). The microcomputer 26 executes a process corresponding to a control program by executing the control program stored in a non-transitory tangible storage medium, and controls operation of the CGW 13.

The data transfer circuit 27 controls data communication with the buses 14 to 18 and 23 in accordance with the CAN data communication standard. The power supply circuit 28 inputs a battery power supply (hereinafter referred to as +B power supply), an accessory power supply (hereinafter referred to as an ACC power supply), and an ignition power supply (hereinafter referred to as an IG power supply). The power supply detection circuit 29 detects a voltage value of the +B power supply, a voltage value of the ACC power supply, and a voltage value of the IG power supply, compares these detected voltage values with a predetermined voltage threshold, and outputs comparison results to the microcomputer 26. The microcomputer 26 receives the comparison results of the +B power supply, the ACC power supply, and the IG power supply from the power supply detection circuit 29, and specifies whether the +B power supply, the ACC power supply, and the IG power supply are normal.

Figure 3:
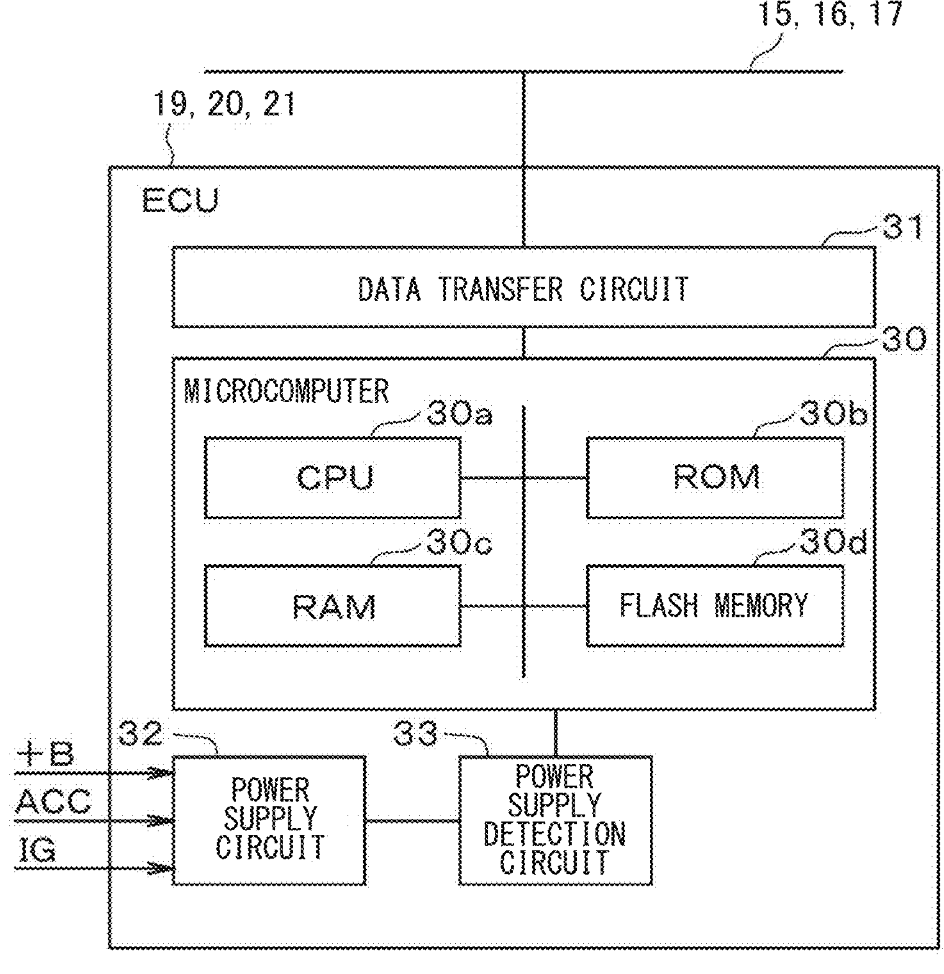
FIG. 3 is a functional block diagram showing an electrical configuration of an ECU.

As shown in FIG. 3, each of the ECUs 19 to 21 includes a microcomputer 30, a data transfer circuit 31, a power supply circuit 32, and a power supply detection circuit 33. The microcomputer 30 includes a CPU 30*a*, a ROM 30*b*, a RAM 30*c*, and a flash memory 30*d* (corresponding to a storage), or the like. The microcomputer 30 executes a process corresponding to a control program by executing the control program stored in a non-transitory tangible storage medium, and controls operations of the ECUs 19 to 21.

The data transfer circuit 31 controls data communication with the buses 15 to 17 in accordance with CAN data communication standards. The power supply circuit 32 inputs the +B power supply, the ACC power supply, and the IG power supply. The power supply detection circuit 33 detects a voltage value of the +B power supply, a voltage value of the ACC power supply, and a voltage value of the IG power supply, compares these detected voltage values with a predetermined voltage threshold, and outputs comparison results to the microcomputer 30. The microcomputer 30 receives the comparison results of the +B power supply, the ACC power supply, and the IG power supply from the power supply detection circuit 33, and specifies whether the +B power supply, the ACC power supply, and the IG power supply are normal. The ECUs 19 to 21 have, for example, different loads of a sensor, an actuator, or the like, and basically have the same configuration.

The DCM 12 has the similar configuration to the ECU 19 shown in FIG. 13. Further, the DCM 12 has a communication device that communicates with the center device 3 and a GPS (Global Positioning System) that can detect a position of the vehicle. Here, a flash memory 28*d* of the DCM 12 has a sufficient capacity for storing a distribution package. The in-vehicle display 10 has the similar configuration to the ECU 19 shown in FIG. 3. The in-vehicle display 10 is connected to a display instrument (not shown) so that data can be transmitted and received. The power supply management ECU 22 has the similar configuration to the ECU 19 shown in FIG. 3.

As a type of the flash memory 30*d* mounted in each of the ECUs 19 to 21, there are three type of memories: a single-bank memory having, on a single bank, an application area onto which the application programs are placed; a single-bank suspended memory having the application areas on a pseudo double-bank; and a double-bank memory having application areas on physically independent double banks. Hereinafter, the ECU having a single-bank memory is referred to as a single memory type ECU, the ECU having a single-bank suspended memory is referred to as a single-bank suspended memory ECU, and the ECU having a double-bank memory may be referred to as a double-bank memory ECU. In the present embodiment, the configuration in which the CPU 30*a* and the ROM 30*b* are placed in the microcomputer 30 is exemplified. However, while the CPU 30*a* is placed inside the microcomputer 30, the ROM 30*b* may be placed outside the microcomputer 30. A so-called external memory type configuration may be provided.

The single-bank memory ECU has a single physically independent program storage area. Therefore, there is no concept of the active bank and the inactive bank in the single-bank memory, and therefore the application program cannot be rewritten while the application process is executed. Therefore, the single-bank memory ECU executes the rewrite program and executes the rewrite process of the application program in a state where the application program is stopped and the application process or the diagnosis process is stopped.

On the other hand, the single-bank suspended memory ECU or the double-bank memory ECU has the two physically independent single storage areas. Therefore, there are concepts of the active bank and the inactive bank. Due to the improvement of the configuration, while the application program is executed and the application process or the diagnosis process is executed, the rewrite program is executed and the rewrite process of the application program in the inactive bank can be executed. In the present embodiment, as the flash memory 30*d*, the double-bank memory is used. By improving the memory configuration, the rewrite process of the application program in the inactive bank can be executed while the application program in the active bank is executed.

Hereinafter, a configuration of the double-bank memory will be described. As shown in FIGS. 4 to 7, the double-bank memory has a boot area and application areas. One of the application areas is placed as a bank-A, and the other is placed as a bank-B. Both a reprograming firmware embedded type in which a reprograming firmware is incorporated in advance and a reprograming firmware download type in which a reprograming firmware is externally downloaded are adopted for the double-bank memory. Hereinafter, each configuration will be described.

(1) Reprograming Firmware Embedded Type

Figure 4:
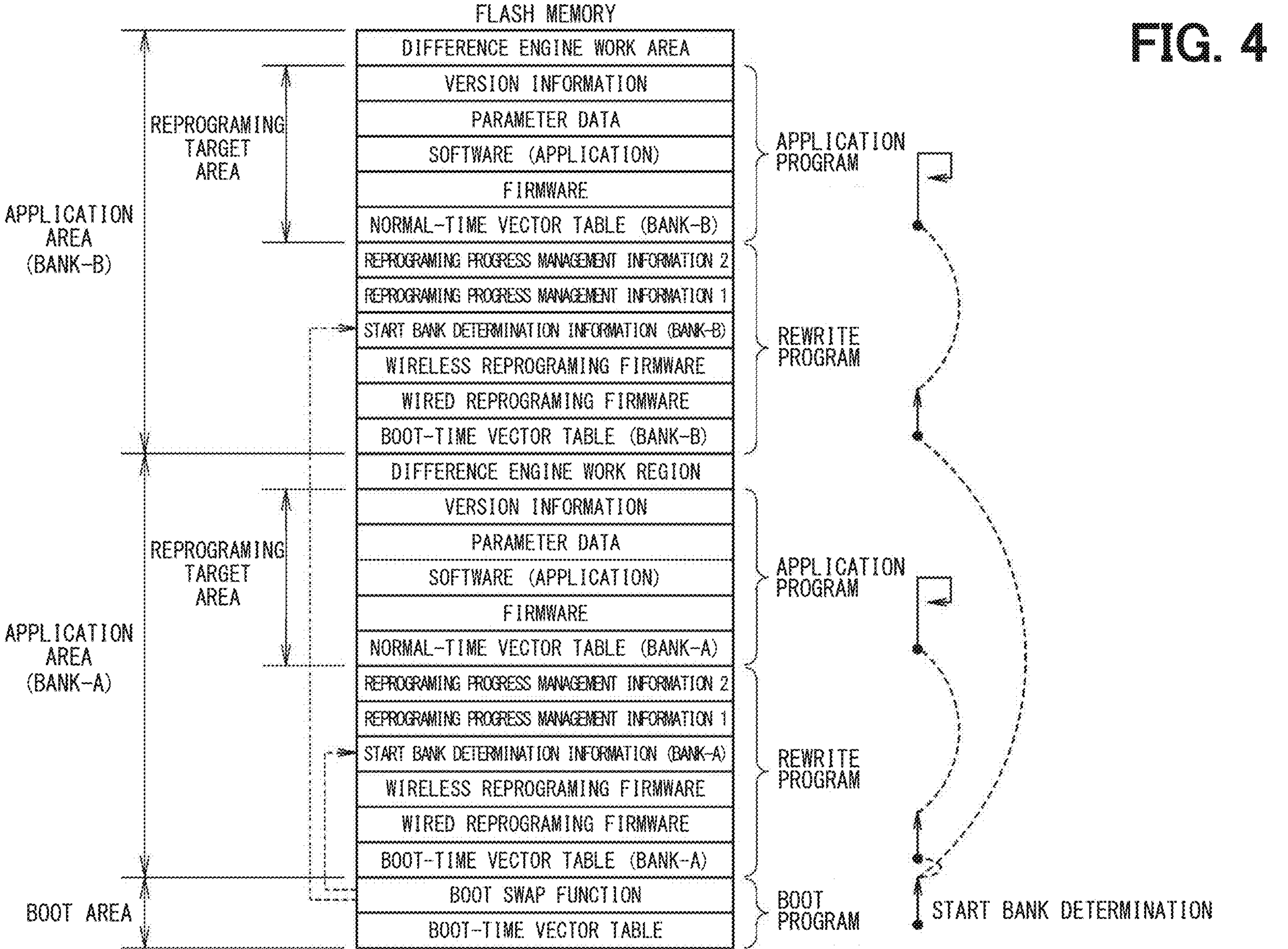
FIG. 4 is a diagram showing a mode during a normal operation in a double-bank memory of a reprograming firmware embedded type.

FIG. 4 shows the double-bank memory with the reprograming firmware embedded type. The firmware for rewrite is stored in the flash memory in advance. As shown in FIG. 4, a boot program is placed in the boot area in a state where the boot program is not rewritable. The boot program includes a boot swap function and a boot-time vector table. In each of the application areas, a difference engine work area, the application program, the rewrite program for rewriting the application program are placed in advance. The application program includes version information, parameter data, software (application), firmware, a normal-time vector table. The rewrite program includes reprograming progress management information 2, reprograming progress management information 1, start bank determination information, wireless reprograming firmware, wired reprograming firmware, and the boot-time vector table. The wireless reprograming firmware is firmware that executes a process of rewriting the ECU by using the application program acquired from the outside of the vehicle via wireless connection. The wired reprograming firmware is a firmware that executes a process of rewriting the ECU by using the application program acquired from the outside of the vehicle via wire. The reprograming firmware includes a basic component such as a program that erases and writes the memory or a difference engine.

The two application areas are referred to as the bank-A and the bank-B. During normal operation in which an application process such as a vehicle control process or a diagnosis process is executed, the microcomputer 30 executes the boot program and determines which bank is an active bank between the bank-A and the bank-B by determining whether the program on each of the bank-A and the bank-B is new or old based on the start bank determination information for each of the bank-A and the bank-B through an start bank determination function. When the microcomputer 30 determines that the bank-A is the active bank, the microcomputer 28 searches for the head address by referring to the boot time vector table and the normal time vector table for the bank-A, and executes the application program in the bank-A. Similarly, when the microcomputer 30 determines that the bank-B is the active bank, the microcomputer 28 searches for the head address by referring to the boot time vector table and the normal time vector table for the bank-B, and executes the application program in the bank-B.

Figure 5:
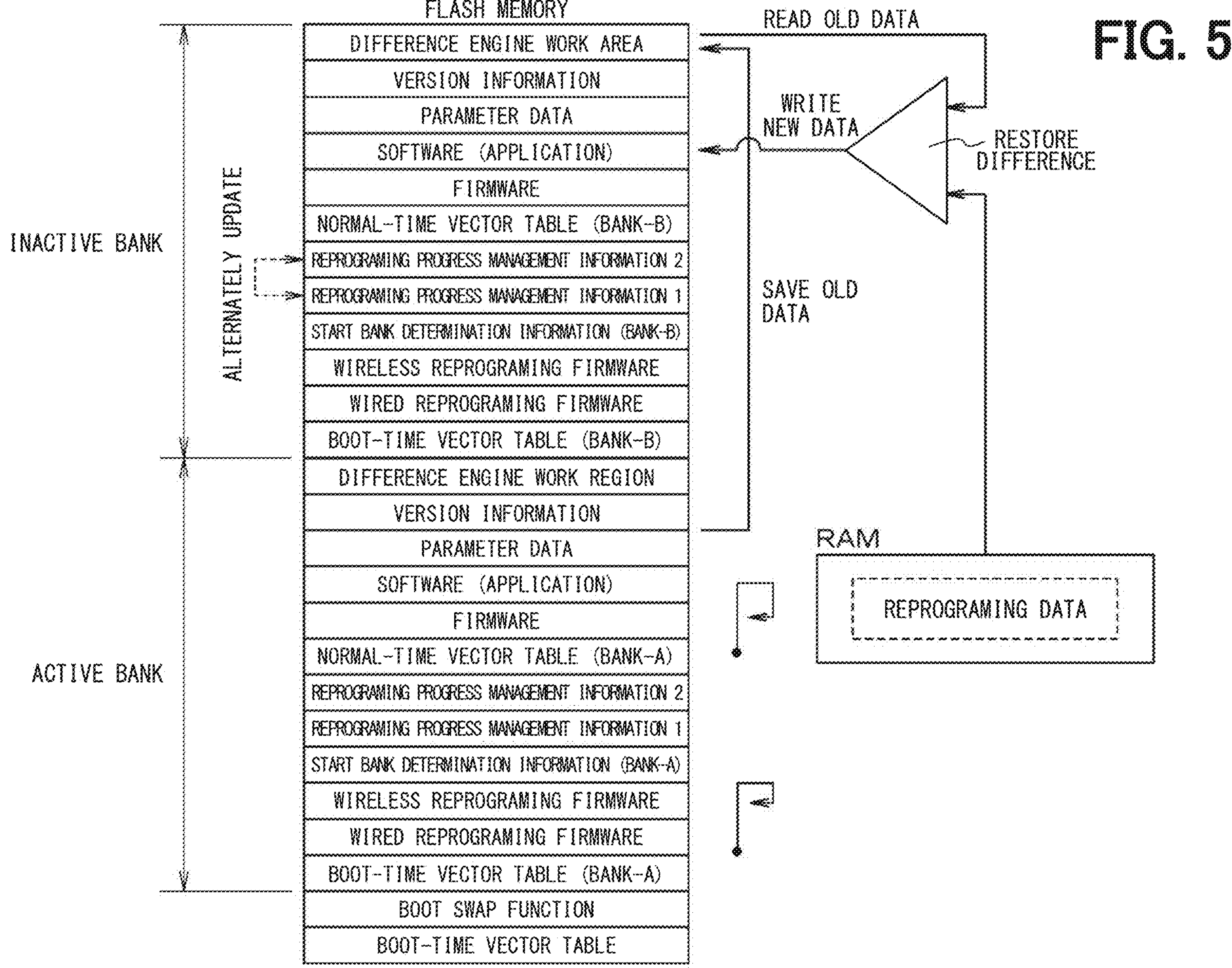
FIG. 5 is a diagram showing a mode during a rewrite operation in the double-bank memory of the reprograming firmware embedded type.

During programs rewrite operation for executing the rewrite process of an application program in the inactive bank, the microcomputer 30 temporarily saves the application program in the difference engine work area from the inactive as old data as shown in FIG. 5. Then, the microcomputer 30 reads the old data temporarily saved in the difference engine work area, and restores new data from the read old data and the difference reprograming data stored in the RAM 30*c* through the embedded reprograming firmware. When the microcomputer 30 generates the new data from the old data and the difference reprograming data, the microcomputer 30 rewrites the application program in the inactive bank by writing the generated new data onto the in-active. It should be noted that the old data to be temporarily saved in the difference engine work area may be an application program in the active bank, or may be an application program in the inactive. When the application program in the active bank is targeted, the data in the inactive bank is deleted before the new data is written. Here, when the reprograming data acquired from the outside of the vehicle is not the difference data but all data (full data), the acquired reprograming data is written as new data in the inactive bank.

(2) Reprograming Firmware Download Type

As shown in FIG. 6, in the reprograming firmware download type, the reprograming firmware is received from the outside of the vehicle, stored in the RAM, and executed on the RAM. Compared with the reprograming firmware embedded type described above, the reprograming firmware downloaded type differs in that, after the wireless reprograming firmware or the wired reprograming firmware is downloaded from the outside and the application program is rewritten, the wireless reprograming firmware or the wired reprograming firmware is deleted.

During the normal operation in which the application process such as the vehicle control process or the diagnosis process is executed, the microcomputer 30 executes the boot program, determines which area is the active bank between the bank-A and the bank-B by determining whether the program on each of the bank-A and the bank-B is new or old based on the start bank determination information for each of the bank-A and the B-bank through the start bank determination function, executes the application program in the active bank, and executes the application program, similarly to the reprograming firmware embedded type.

During a rewrite operation for executing the rewrite process of the application program, the microcomputer 30 temporarily saves the application program in the difference engine work area from the inactive bank as old data as shown in FIG. 7. Then, the microcomputer 30 reads the old data temporarily saved in the difference engine work area, and restores new data from the old data and the difference reprograming data stored in the RAM 30*c* through the reprograming firmware downloaded from the outside. When the microcomputer 30 generates the new data from the old data and the difference reprograming data, the microcomputer 30 rewrites the application program by writing the generated new data onto the inactive bank. After the rewriting is completed, the microcomputer 30 deletes the downloaded reprograming firmware from the RAM. It should be noted that the old data to be temporarily saved in the difference engine work area may be the application program in the active bank, or may be the application program in the inactive bank. When the application program in the active bank is targeted, the data in the inactive bank is deleted before the new data is written. Here, when the reprograming data acquired from the outside of the vehicle is not the difference data but all data (full data), the acquired reprograming data is written as the new data in the inactive bank.

As described above, in both of the reprograming firmware embedded type and the reprograming firmware download type, the application program and the rewrite program for rewriting the application program are placed in each application area. Although FIG. 4 and FIG. 6 show the application program as the reprograming target, the rewrite program may also be the reprograming target. When the rewrite program is required to be non-rewritable, the rewrite program may be placed in the boot area. For example, a program for wired rewriting may be placed in the boot area so that wire rewriting via a tool is reliably performed by a dealer or the like.

Figure 8:
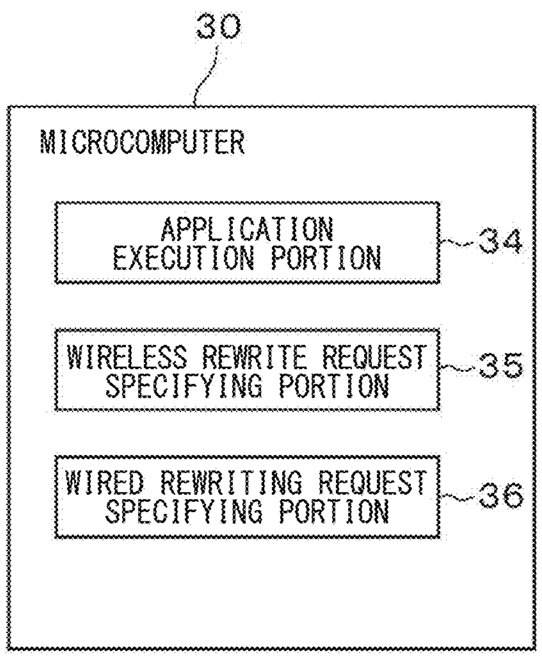
FIG. 8 is a functional block diagram showing a configuration for each process of a microcomputer.

As shown in FIG. 8, the microcomputer 30 includes an application execution portion 34, a wireless rewrite request specifying portion 35, and a wired rewrite request specifying portion 36 as functional blocks for each process. The application execution portion 34 has a function of arbitrating the execution of each program. The wireless rewrite request specifying portion 35 has a function of specifying the program rewrite request via wireless connection. The wired rewrite request specifying portion 36 has a function of specifying the program rewrite request via wired connection.

Figure 9:
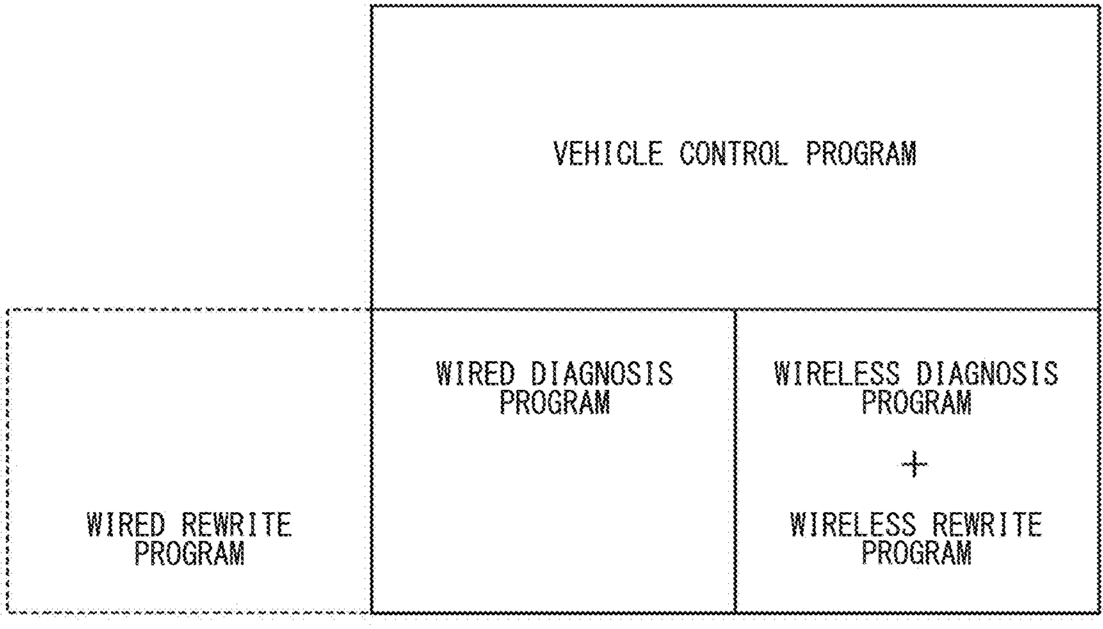
FIG. 9 is a diagram (first part) showing a program configuration.

FIG. 9 shows a configuration of each program stored in the flash memory. A vehicle control program is a program for implementing the vehicle control function (for example, steering control function) mounted in the ECUs 19 to 21. A wired diagnosis program is a program for diagnosing the ECUs 19 to 21 from the outside of the vehicle via wired connection. A wireless diagnosis program is a program for diagnosing the ECUs 19 to 21 from the outside of the vehicle via wireless connection. A wireless rewrite program is a program for rewriting the program acquired from the outside of the vehicle via wireless connection. A wired rewrite program is a program for rewriting the program acquired from the outside of the vehicle via wired connection. The vehicle control program is placed as a first program in an application area. The wired diagnosis program and the wired rewrite program are placed as a second program in the application area. The wireless diagnosis program and the wireless rewrite program are placed as a third program in the application area. In other words, the second program is a program for executing a special process via wired connection other than the vehicle control process. The third program is a process for a special process via wireless connection other than the vehicle control process. The wired rewrite program may not be placed in the application area, and may be placed as a fourth program in the boot area.

The application execution portion 34 controls (non-exclusively controls) the first program, the second program, and the third program so as to execute the programs at the same time. The application execution portion 34 can execute, for example, the vehicle control program, the wired diagnosis program, and the wireless diagnosis program at the same time. That is, the application execution portion 34 can simultaneously execute the vehicle control, wired diagnosis of the ECUs 19 to 21, and wireless diagnosis of the ECUs 19 to 21. Similarly, the application execution portion 34 controls the vehicle control program, the wired diagnosis program, and the wireless rewrite program as to be capable of simultaneously executing the programs. The application execution portion 34 controls the vehicle control program, the wired rewrite program, and the wireless diagnosis program so as to be capable of simultaneously executing the programs. The application execution portion 34 controls the vehicle control program, the wired rewrite program, and the wireless rewrite program so as to be capable of simultaneously executing the programs.

On the other hand, the application execution portion 34 exclusively controls each program in the second program so as to be not capable of simultaneously executing each program. Similarly, the application execution portion 34 exclusively controls each program in the third program so as to be not capable of simultaneously executing each program. The application execution portion 34 exclusively controls, for example, the wired diagnosis program and the wired rewrite program, and exclusively controls the wireless diagnosis program and the wireless rewrite program. That is, the application execution portion 34 executes only one program of the special process via wired connection. Similarly, the application execution portion 34 executes only one program of the special process via wireless connection.

In other words, the wireless rewrite program is placed inside the wireless diagnosis program, and embedded as a part of the wireless diagnosis program. That is, since the wireless rewrite program is placed inside the wireless diagnosis program, in a case where a state transitions from a default session or a wireless diagnosis session to a wireless rewrite session during the execution of the vehicle control program and the wired diagnosis program as described later, the application execution portion 34 executes the wireless rewrite program while continuously executing the vehicle control program and wired diagnosis program. The application execution portion 34 can simultaneously execute the vehicle control program, the wired diagnosis program, and the wireless rewrite program by starting execution of the wireless rewrite program while continuing execution of the vehicle control program and the wired diagnosis program. That is, the application execution portion 34 controls the vehicle control, the wired diagnosis of the ECUs 19 to 21, and the wireless rewriting of the application program so as to be capable of simultaneously executing the vehicle control, the wired diagnosis of the ECUs 19 to 21, and the wireless rewriting of the application program.

Here, depending on the specific contents of the diagnosis process or the rewrite process, the wired diagnosis and the wireless diagnosis may not be simultaneously performed, and the wired rewriting and the wireless rewriting may not be simultaneously performed. For example, when the wired rewriting and the wireless rewriting rewrite the same area, both processes conflict. Therefore, the application execution portion 34 exclusively controls the wired diagnosis program and the wireless diagnosis program in accordance with the specific contents of the process or the request, or exclusively controls the wired rewrite program and the wireless rewrite program. Depending on the content of the diagnosis process, the normal vehicle control may not be capable of being continued. For example, in a case of the diagnosis process in which the ECU is operated and the result is read, the process and the normal vehicle control cannot be simultaneously executed. In that case, the application execution portion 34 performs an arbitration control of waiting the vehicle control program and executing the wired diagnosis program or the wireless diagnosis program.

On the other hand, when the wired rewrite program is not placed in the application area and placed as the fourth program in the boot area, the application execution portion 34 performs an arbitration control partially different from the above. As shown by a broken line in FIG. 9, the wired rewrite program is placed as the fourth program outside the wired diagnosis program, and is not embedded as a part of the wired diagnosis program. In this case, the application execution portion 34 performs exclusive control so as to end the first to third programs when executing the fourth program. That is, the application execution portion 34 switches from a mode for executing the first to third programs to a dedicated mode for executing the fourth program. In other words, since the wired rewrite program is placed outside the wired diagnosis program, in a case where the state transitions from a wired diagnosis session to a wired rewrite session as described later during the execution of the vehicle control program and the wireless diagnosis program, the application execution portion 34 stops the execution of the vehicle control program and the wireless diagnosis program and starts the execution of the wired rewrite program. By stopping executions of the vehicle control program and the wireless diagnosis program and starting execution of the wired rewrite program, the application execution portion 34 cannot simultaneously execute the vehicle control program, the wireless diagnosis program, and the wired rewrite program, and can execute only the wired rewrite program. That is, the application execution portion 34 does not enable simultaneous execution of the vehicle control, the wireless diagnosis of the ECUs 19 to 21, and the wired rewriting of the application program, and enables execution of only the wired rewriting of the application program.

As shown in FIG. 10, the application execution portion 34 manages, as a first state related to a wired special process, a default state (default session), a wired diagnosis state (wired diagnosis session), and a wired rewrite state (wired rewrite session). The application execution portion 34 manages, as a second state related to a wireless special process, a default state (default session) and a wireless rewrite state (wireless rewrite session), and manages an internal state of the operation.

As a state transition of the first state, the application execution portion 34 causes the state to exclusively transition to the default session capable of performing the vehicle control in accordance with the diagnosis communication standard, the wired diagnosis session capable of diagnosing the ECUs 19 to 21 from the outside of the vehicle via wired connection, or the wired rewrite session capable of rewriting the application program acquired from the outside of the vehicle via wired connection. The exclusive state transition of the session makes it impossible to establish the session at the same time, and non-exclusive state transition of the session makes it possible to establish the session at the same time.

The default session in the first state is a mode indicating a state where the wire special process is not executed, and is a state where the vehicle control can be executed. The default session is a process that does not affect the vehicle control at all and is, for example, a mode in which the diagnosis program not related to the vehicle control may be executed. The diagnosis program not related to the vehicle control is a program for reading information such as a trouble code or the like. The wired diagnosis session is a mode for executing the diagnosis program related to the diagnosis of the ECUs 19 to 21. At least, when the diagnosis program is executed and thereby the vehicle control is affected, the default session is shifted to the wired diagnosis session. The diagnosis program related to the diagnosis of the ECUs 19 to 21 is a program for stopping communication, performing a diagnostic mask, driving an actuator, or the like. The wired rewrite session is a mode for rewriting the application program acquired from the outside of the vehicle via wired connection.

The application execution portion 34 causes the session in the first state to transition as follows. When the wired diagnosis request occurs in a first default session state, the application execution portion 34 causes the session to transition from the first default session to the wired diagnosis session in accordance with a diagnosis session transition request and executes the wired diagnosis process. When a session return request occurs in the state of the wired diagnosis session or a timeout occurs, the power supply is turned off, or a legal service is received, the application execution portion 34 shifts from the wired diagnosis session to the first default session. When the wired rewrite request occurs in the first default session state, the application execution portion 34 causes the session to transition from the first default session to the wired diagnosis session in accordance with the diagnosis session transition request. Thereafter, the application execution portion 34 shifts from the wired diagnosis session to the wired rewrite session in accordance with a rewrite session transition request, and executes the wired rewrite process. When the session return request occurs in the state of the wired rewrite session, the timeout occurs, the power supply is turned off, or a legal service is received, the application execution portion 34 shifts the session from the wired rewrite session to the first default session. The application execution portion 34 maintains the current session without shifting the current session in accordance with a session maintenance request.

As a state transition of the second state, the application execution portion 34 causes the state to exclusively transition to the default session capable of performing the vehicle control in accordance with the diagnosis communication standard and a wireless rewrite session related to the application program acquired via wireless connection. The wireless rewrite session is a mode for rewriting the application program acquired from the outside of the vehicle via wireless connection.

The application execution portion 34 causes the state of the session in the second state to transition as follows. When the wireless rewrite request occurs in a second default session state, the application execution portion 34 causes the session to transition from the second default session to the wireless rewrite session in accordance with a rewrite session transition request and executes the wireless rewrite process. When the session return request occurs in the state of the wireless rewrite session, the timeout occurs, or the power supply is turned off, the application execution portion 34 shifts the session from the wireless rewrite session to the second default session. The application execution portion 34 maintains the current session without shifting the current session in accordance with a session maintenance request.

The application execution portion 34 manages the first state related to the wired special process and the second state related to the wireless special process while executing the vehicle control program as the first program. For example, when the wired diagnosis request occurs in the default sessions of the first state and the second state, the application execution portion 34 shifts the first state to the wired diagnosis session and starts execution of the wired diagnosis program while continuing the vehicle control program. In this state, when the wireless rewrite request occurs, the application execution portion 34 shifts the second state to the wireless rewrite session and starts execution of the wireless rewrite program while continuing the execution of the vehicle control program and the wired diagnosis program. In this state, when the wired rewrite request occurs, for example, the application execution portion 34 ends the execution of the wireless rewrite program and shifts the second state to the default session. In addition, the application execution portion 34 ends the execution of the wired diagnosis program, shifts the first state to the wired rewrite session, and starts the execution of the wired rewrite program. In order to prevent the rewrite processes to the same memory area from colliding, the application execution portion 34 causes the state of the wired rewrite session in the first state and the state of the wireless rewrite session in the second state to exclusively transition so that the sessions are not established at the same time (that is, exclusively controls the sessions).

The wireless rewrite request specifying portion 35 determines the identification information of the rewrite request received from the outside, and specifies the wireless rewrite request. That is, when the reprograming data is downloaded from the center device 3 to the DCM 12 and the CGW 13 distributes the reprograming data transferred from the DCM 12 to the rewrite target ECU, the wireless rewrite request specifying portion 35 specifies the wireless rewrite request by receiving the reprograming data and the identification information indicating the wireless rewrite request from the CGW 13.

The wired rewrite request specifying portion 36 determines the identification information of the rewrite request received from the outside, and specifies the wired rewrite request. That is, when the tool 25 is connected to the DLC connector 24 and the CGW 13 distributes the reprograming data transferred from the tool 25 to the rewrite target ECU, the wired rewrite request specifying portion 36 specifies the wired rewrite request by receiving the reprograming data and the identification information indicating the wired rewrite request from the CGW 13.

The identification information may be, for example, information corresponding to the different IDs in the wired rewrite request and the wireless rewrite request, and may be information corresponding to different data having the same ID in the wired rewrite request and the wireless rewrite request. That is, any information may be used as long as the wired rewrite request and the wireless rewrite request can be distinguished.

Figure 12:
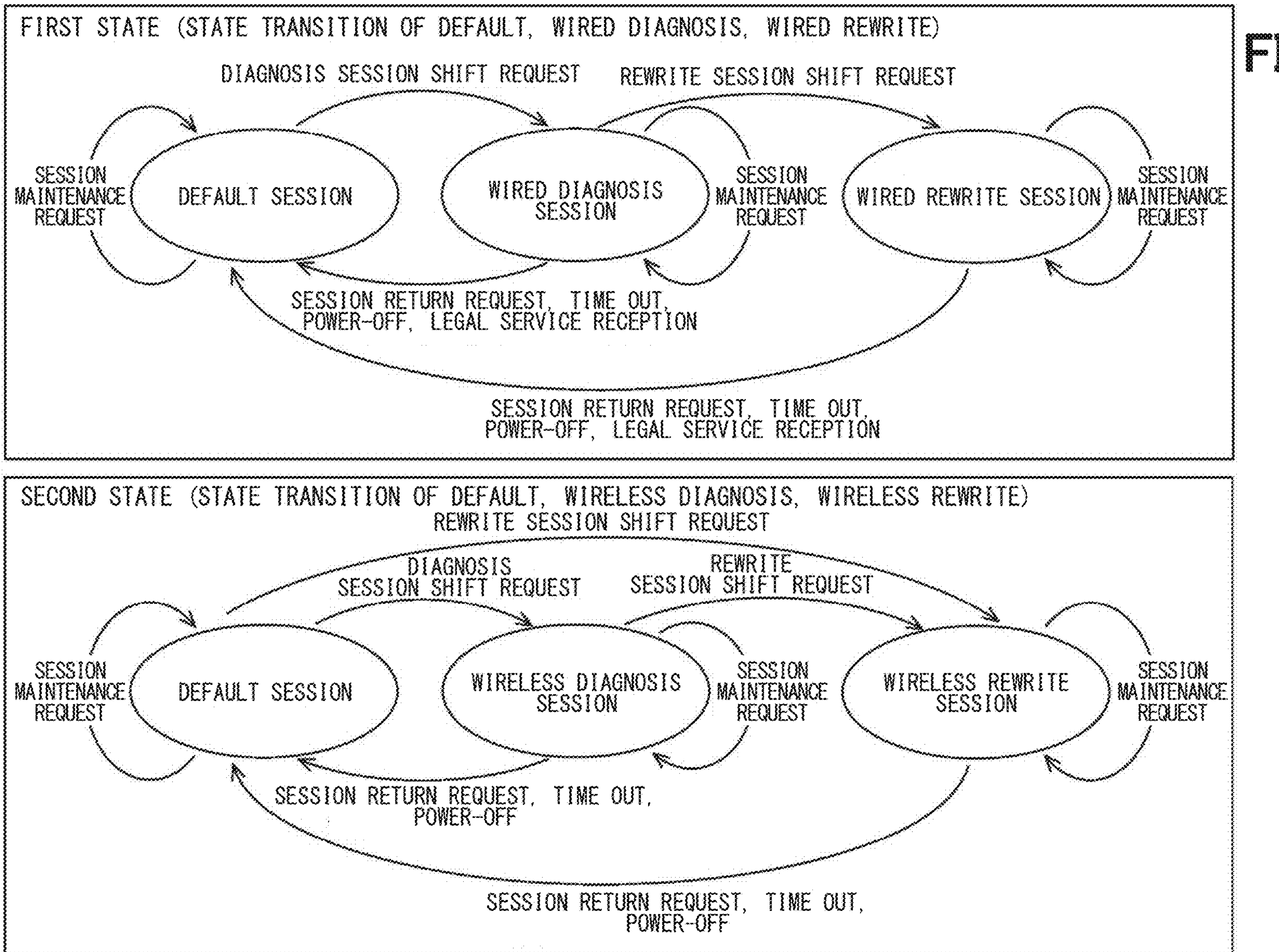
FIG. 12 is a diagram (third part) showing the state transition.
Figure 16:
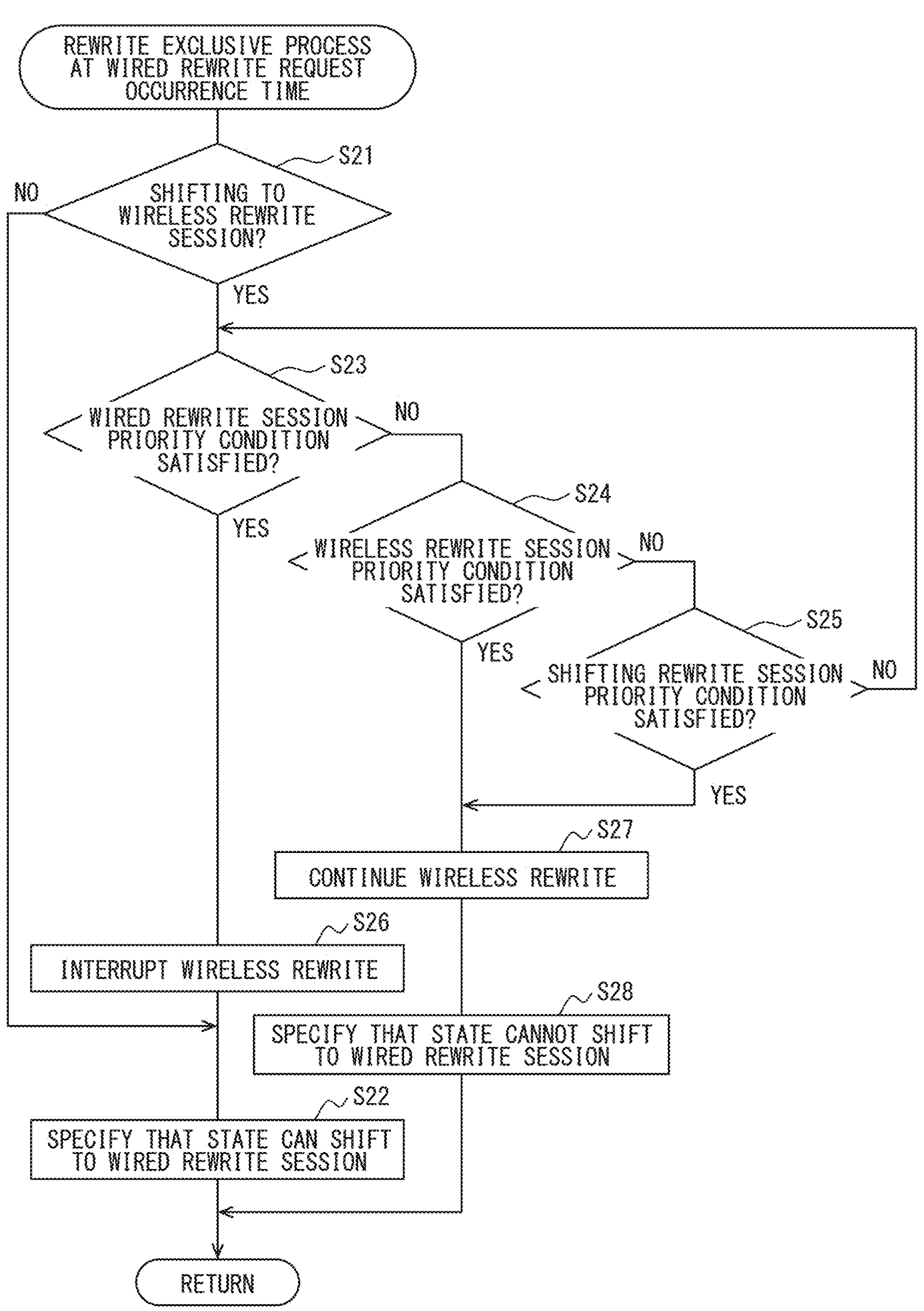
FIG. 16 is a flowchart (second part) showing the state transition management process of the first state.

FIG. 10 shows that the application execution portion 34 has the configuration of managing, as the second state related to the wireless special process, the two states of the default session and the wireless rewrite session. However, as shown in FIG. 11 and FIG. 12, the application execution portion 34 may have a configuration of managing, as the second state, three states of the default session, the wireless diagnosis session, and the wireless rewrite session. The wireless diagnosis session is a mode that executes the wireless diagnosis program for diagnosing the ECUs 19 to 21 from the outside of the vehicle via wireless connection. At least, when the wireless diagnosis program that may affect the vehicle control is executed, the session is shifted to the wireless diagnosis session.

In the case of the configuration shown in FIG. 11, the application execution portion 34 causes the second state to transition as follows. When the wireless diagnosis request occurs in a second default session state, the application execution portion 34 causes the session to transition from the second default session to the wireless diagnosis session in accordance with the diagnosis session transition request and executes the wireless diagnosis process. When the session return request occurs in the state of the wireless diagnosis session, the timeout occurs, or the power supply is turned off, the application execution portion 34 shifts the session from the wireless diagnosis session to the second default session. When the wireless rewrite request occurs in the second default session state, the application execution portion 34 causes the session to transition from the second default session to the wireless diagnosis session in accordance with the diagnosis session transition request. Thereafter, the application execution portion 34 shifts the wireless diagnosis session to the wireless rewrite session in accordance with the rewrite session transition request, and executes the wireless rewrite process. When the session return request occurs in the state of the wireless rewrite session, the timeout occurs, or the power supply is turned off, the application execution portion 34 shifts the session from the wireless rewrite session to the second default session.

In the case of the configuration shown in FIG. 12, the application execution portion 34 causes the second state to transition as follows. When the wireless diagnosis request occurs in a second default session state, the application execution portion 34 causes the session to transition from the second default session to the wireless diagnosis session in accordance with the diagnosis session transition request and executes the wireless diagnosis process. When the session return request occurs in the state of the wireless diagnosis session, the timeout occurs, or the power supply is turned off, the application execution portion 34 shifts the session from the wireless diagnosis session to the second default session. When the wireless rewrite request occurs in the second default session state, the application execution portion 34 causes the session to transition from the second default session to the wireless diagnosis session in accordance with the diagnosis session transition request. Thereafter, the application execution portion 34 shifts the wireless diagnosis session to the wireless rewrite session in accordance with the rewrite session transition request or shifts the second default session to the wireless rewrite session in accordance with the rewrite session transition request, and executes the wireless rewrite process. When the session return request occurs in the state of the wireless rewrite session, the timeout occurs, or the power supply is turned off, the application execution portion 34 shifts the session from the wireless rewrite session to the second default session.

In the wired diagnosis session of the first state and the wireless diagnosis session of the second state, the same diagnosis program may be executed, or the different diagnostic programs may be executed. In the wired rewrite session of the first state and the wireless rewrite session of the second state, the same rewrite program may be executed, or the different rewrite programs may be executed. For example, a common rewrite program such as erasing or rewriting a program may be executed.

The arbitration of each session of the first state and each session of the second state in the configurations shown in FIG. 11 and FIG. 12 will be described. As described in FIG. 9, a case where the wired diagnosis program is placed as the second program in the application area, the wireless diagnosis program and the wireless rewrite program are placed as the third program in the application area, and the wired diagnosis program is placed as the fourth program in the boot area will be described. In other words, a configuration in which the wireless rewrite program is embedded as a part of the wireless diagnosis program and the wired rewrite program is not embedded as a part of the wired diagnosis program will be described. In this case, the arbitration of the program execution in each session of the first state and the second state is shown in FIG. 13.

When the second state is the wireless rewrite session and the first state is the default session, the application execution portion 34 executes the wireless rewrite program while executing the vehicle control program. When the second state is the wireless rewrite session and the first state is the wired diagnosis session, the application execution portion 34 simultaneously executes the wireless rewrite program and the wired diagnosis program while executing the vehicle control program.

On the other hand, when the first state is the wired rewrite session and the second state is the default session, the application execution portion 34 ends the vehicle control program and executes only the wired rewrite program. When the first state is the wired rewrite session and when the second state is the wireless diagnosis session, the application execution portion 34 ends the wireless diagnosis program and the vehicle control program and executes only the wired rewrite program. That is, the application execution portion 34 exclusively controls the first to third programs as a dedicated mode for executing on the wired rewrite program that is the fourth program.

The configuration in which the wired diagnosis program and the wired rewrite program are placed as the second program in the application area is partially different from that of FIG. 13 in the arbitration of each program. That is, in a case of a configuration in which the wireless rewrite program is embedded as a part of the wireless diagnosis program and the wired rewrite program is embedded as a program of the wired diagnosis program, the program execution in each session of the first state and the second state is arbitrated as shown in FIG. 14. In this case, when the first state is the wired rewrite session and the second state is the default session, the application execution portion 34 executes the wired rewrite program while executing the vehicle control program. When the first state is the wired rewrite session and the second state is the wireless diagnosis session, the application execution portion 34 simultaneously executes the wired rewrite program and the wireless diagnosis program while executing the vehicle control program.

Next, operation of the above configuration will be described with reference to FIGS. 15 to 19. When detecting that the power supply is turned on and starting up, the microcomputer 30 executes the session establishment program and the state transition management process. The microcomputer 30 executes the state transition management process that manages the state transition of the first state and executes the state transition management process that manages the state transition of the second state. Hereinafter, each of the state transition management processes will be described. Here, a case where the application execution portion 34 has the configuration shown in FIG. 10, that is, a configuration that does not include the wireless diagnosis session and manages the second state will be described.

(1) State Transition Management Process of First State

When detecting that the power supply is turned on and starting the state transition management process of the first state, the microcomputer 30 determines a rewrite completion flag and determines whether the rewriting of the previous application program is normally completed (S1). When determining that the rewrite completion flag is positive and determining that the rewriting of the previous application program is normally completed (S1: YES), the microcomputer 30 shifts the first state to the default session (S2). That is, the microcomputer 30 starts the vehicle control process by shifting the first state to the default session.

When executing the vehicle control program and starting the vehicle control process, the microcomputer 30 determines whether the wired diagnosis request occurs (S3) during the execution of the vehicle control process, determines whether the wired rewrite request occurs (S4), and determines whether a completion condition of the state transition management is satisfied (S5). When determining that the wired diagnosis request has occurred (S3: YES) during the execution of the vehicle control process, the microcomputer 30 shifts the first state from the default session to the wired diagnosis session (S6), and executes the wired diagnosis program and starts the wired diagnosis process (S7). The microcomputer 30 determines whether the completion condition of the wired diagnosis process is satisfied (S8). When determining that the completion condition of the wired diagnosis process is satisfied (S8: YES), the microcomputer 30 ends the wired diagnosis program and ends the wired diagnosis process (S9). The microcomputer 30 shifts the first state from the wired diagnosis session to the default session (S10).

When determining that the wired rewrite request has occurred (S4: YES) during the execution of the vehicle control process, the microcomputer 30 starts the rewrite exclusive process at the occurrence time of the wired rewrite request (S11). That is, it is a process for performing the exclusive control so that the wired rewrite process and the wireless rewrite process do not collide with each other. When starting the rewrite exclusive process at the wired rewrite request occurrence time, the microcomputer 30 determines whether the second state is shifting to the wireless rewrite session, that is, the second state is the wireless rewrite session (S21). When determining the second state is not shifting to the wireless rewrite session (S21: NO), the microcomputer 30 specifies that the first state can shift to the wired rewrite session (S22). The microcomputer 30 ends the rewrite exclusive process at the time of the wired rewrite request occurrence, and returns to the state transition management process of the first state.

When determining that the session is shifting to the wireless rewrite session in the second state (S21: YES), the microcomputer 30 determines which of the wired rewrite session and the wireless rewrite session is prioritized and the exclusive control is performed. Specifically, the microcomputer 30 determines whether any of a wired rewrite session priority condition, a wireless rewrite session priority condition, and a shifting rewrite session priority condition is satisfied (S23 to S25). The wired rewrite session priority condition is a condition for prioritizing the wired rewrite session over the wireless rewrite session. The wireless rewrite session priority condition is a condition for prioritizing the wireless rewrite session over the wired rewrite session. The shifting rewrite session priority condition is a condition for prioritizing the rewrite session, that is, prioritizing a previously shifting session. Which of these priority conditions to be adopted is set in advance. For example, a priority condition flag may be set for the vehicle. The priority condition flag may be set for each rewrite ECU.

When determining that the wired rewrite session priority condition is satisfied (S23: YES), the microcomputer 30 shifts the wireless rewrite session in the second state to the default session in accordance with the session return request and interrupts the wireless rewriting (S26), and specifies that the first state can shift to the wired rewrite session (S22). The microcomputer 30 ends the wireless rewrite program due to the shift to the default session. The microcomputer 30 ends the rewrite exclusive process at the time of the wired rewrite request occurrence, and returns to the state transition management process of the first state.

When determining that the wireless rewrite session priority condition is satisfied (S24: YES), the microcomputer 30 discards the wired rewrite request and continues the wireless rewriting (S27). That is, the microcomputer 30 maintains the second state at the wireless rewrite session, continues the execution of the wireless rewrite program, and specifies that the first state cannot shift to the wired rewrite session (S28). The microcomputer 30 ends the rewrite exclusive process at the time of the wired rewrite request occurrence, and returns to the state transition management process of the first state.

When determining that the shifting rewrite session priority condition is satisfied (S25: YES), also in this case, the microcomputer 30 discards the wired rewrite request and continues the wireless rewriting (S27). That is, the microcomputer 30 maintains the second state at the wireless rewrite session, continues the execution of the wireless rewrite program, and specifies that the first state cannot shift to the wired rewrite session (S28). The microcomputer 30 ends the rewrite exclusive process at the time of the wired rewrite request occurrence, and returns to the state transition management process of the first state. The microcomputer 30 exclusively controls the wired rewrite session and the wireless rewrite session by executing the rewrite exclusive process at the time of wired rewrite request occurrence in such a manner, and prevents the sessions from being simultaneously established.

When returning to the state transition management process of the first state, the microcomputer 30 determines whether it is possible to shift to the wired rewrite session as a result of the rewrite exclusive process at the time of the wired rewrite request occurrence (S12). When specifying that it is possible to shift to the wired rewrite session by the rewrite exclusive process at the time of the wired rewrite request occurrence and determining that it is possible to shift (S12: YES), the microcomputer 30 shifts the first state from the default session to the wired rewrite session via the wired diagnosis session (S13), and interrupts the vehicle control process and starts the wired rewrite process (S14). The microcomputer 30 ends the vehicle control program due to the shift to the wired rewrite session.

The microcomputer 30 determines whether the completion condition of the wired rewrite process is satisfied (S15). When determining that the completion condition of the wired rewrite process is satisfied (S15: YES), the microcomputer 30 completes the wired rewrite process (S16) and shifts the first state from the wired rewrite session to the default session (S17). Here, the completion condition of the wired rewrite process is, for example, a case where all the writing of the application program is completed and an integrity verification is executed, or the like.

When specifying that it is not possible to shift to the wired rewrite session by the rewrite exclusive process at the time of the wired rewrite request occurrence and determining that the shifting cannot be performed (S12: NO), the microcomputer 30 does not shift the first state from the default session to the wired rewrite session via the wired diagnosis session. That is, the microcomputer 30 maintains the first state at the default session. When determining that the completion condition of the state transition management is satisfied (S5: YES), the microcomputer 30 completes the state transition management process of the first state.

In the above, it has been described that, in the rewrite exclusive process at the time of the wired rewrite request occurrence, the microcomputer 30 determines that the second state is shifting to the wireless rewrite session. Further, it has been described that, when determining that the wired rewrite session priority condition is satisfied, the microcomputer 30 interrupts the wireless rewriting in the second state. However, the microcomputer 30 may determine whether to interrupt the wireless rewrite session in accordance with an unrewritten remaining amount of the wireless rewriting.

Figure 17:
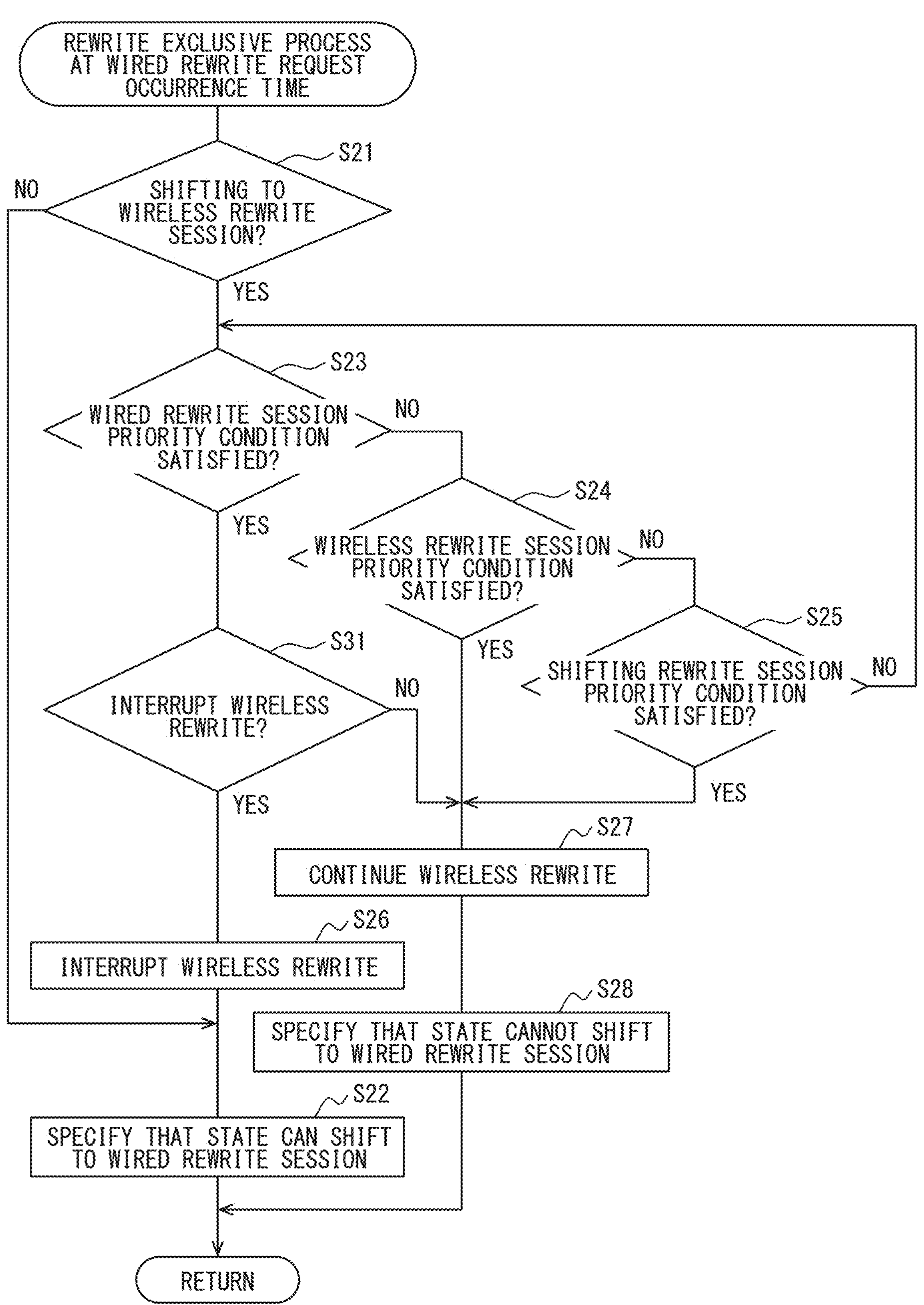
FIG. 17 is a flowchart (third part) showing the state transition management process of the first state.
Figure 19:
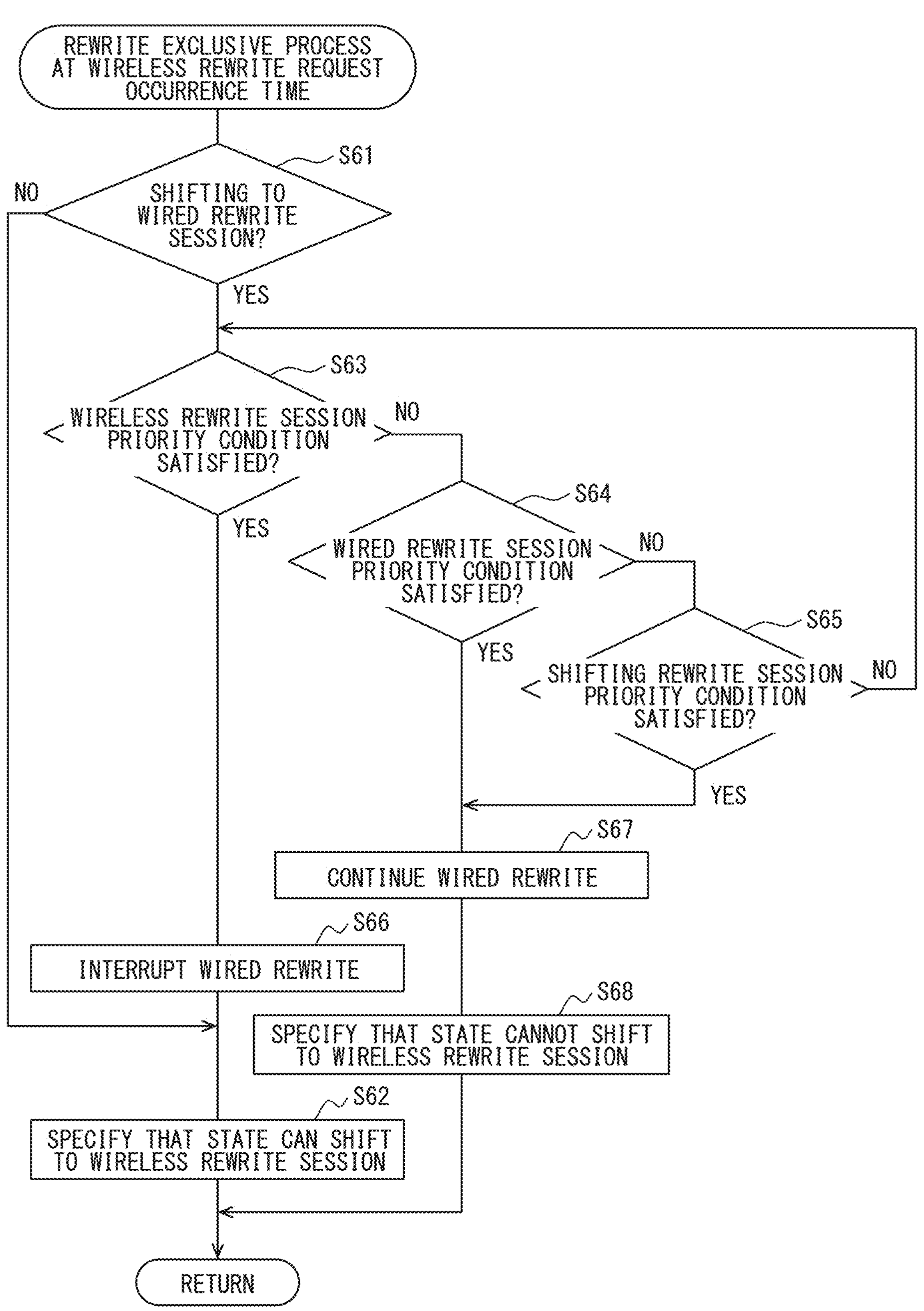
FIG. 19 is a flowchart (second part) of the state transition management process of the second state.

As shown in FIG. 17, the microcomputer 30 determines that the second state is shifting to the wireless rewrite session (S21: YES). When determining that the wired rewrite session priority condition is satisfied (S23: YES), the microcomputer 30 determines whether, in the shifting wireless rewrite session, the unrewritten remaining amount of the wireless rewriting is equal to or higher than a predetermined amount (for example, 20% or more) (S31). When determining that the unrewritten remaining amount of the wireless rewriting is equal to or more than the predetermined amount (S31: YES), the microcomputer 30 shifts the second state from the wireless rewrite session to the default session and interrupts the wireless rewriting (S26). The microcomputer 30 ends the wireless rewrite program due to the shift to the default session. When determining the unrewritten remaining amount of the wireless rewriting is not equal to or more than the predetermined amount (S31: NO), the microcomputer 30 discards the wired rewrite request and continues the wireless rewriting (S27). That is, when a remaining time until the wireless rewriting is completed is relatively long, the microcomputer 30 interrupts the wireless rewrite session. However, when the remaining time until the wireless rewriting is completed is relatively short, the microcomputer 30 does not interrupt the wireless rewrite session and continues the wireless rewrite session.

(2) State Transition Management Process of Second State

When detecting that the power supply is turned on and starting the state transition management process of the second state, the microcomputer 30 determines a rewrite completion flag and determines whether the rewriting of the previous application program is normally completed (S41). When determining that the rewrite completion flag is positive and determining that the rewriting of the previous application program is normally completed (S41: YES), the microcomputer 30 shifts the second state to the default session (S42). That is, the microcomputer 30 executes the vehicle control program by shifting the second state to the default session, and starts the vehicle control process.

When starting the vehicle control process, the microcomputer 30 determines whether the wireless rewrite request occurs (S43) and determines whether the completion condition of the state transition management is satisfied (S44). When determining that the wireless rewrite request occurs during the execution of the vehicle control process (S43: YES), the microcomputer 30 starts the rewrite exclusive process at the time of the wireless rewrite request occurrence (S44). When starting the rewrite exclusive process at the wireless rewrite request occurrence time, the microcomputer 30 determines whether the session in the first state is shifting to the wired rewrite session, that is, the first state is the wired rewrite session (S61). When determining the session in the first state is not shifting to the wired rewrite session (S61: NO), the microcomputer 30 specifies that it is possible to shift to the wireless rewrite session (S62). The microcomputer 30 ends the rewrite exclusive process at the time of the wireless rewrite request occurrence, and returns to the state transition management process of the second state.

When determining that the session is shifting to the wired rewrite session in the first state (S61: YES), the microcomputer 30 determines which of the wired rewrite session and the wireless rewrite session is prioritized for performing the exclusive control. Specifically, the microcomputer 30 determines whether any of the wireless rewrite session priority condition, the wired rewrite session priority condition, and a shifting rewrite session priority condition is satisfied (S63 to S65).

When determining that the wireless rewrite session priority condition is satisfied (S63: YES), the microcomputer 30 shifts the wired rewrite session in the first state to the default session in accordance with the session return request and interrupts the wired rewriting (S66), and specifies that the second state can shift to the wireless rewrite session (S62). The microcomputer 30 ends the wired rewrite program due to the shift to the default session. The microcomputer 30 ends the rewrite exclusive process at the time of the wireless rewrite request occurrence, and returns to the state transition management process of the second state.

When determining that the wired rewrite session priority condition is satisfied (S64: YES), the microcomputer 30 discards the wireless rewrite request and continues the wired rewriting (S67). That is, the microcomputer 30 maintains the first state at the wired rewrite session, continues the execution of the wired rewrite program, and specifies that the second state cannot shift to the wireless rewrite session (S68). The microcomputer 30 ends the rewrite exclusive process at the time of the wireless rewrite request occurrence, and returns to the state transition management process of the second state.

When determining that the shifting rewrite session priority condition is satisfied (S65: YES), also in this case, the microcomputer 30 discards the wireless rewrite request and continues the wired rewriting (S67). That is, the microcomputer 30 maintains the first state at the wired rewrite session, continues the execution of the wired rewrite program, and specifies that the second state cannot shift to the wireless rewrite session (S68). The microcomputer 30 ends the rewrite exclusive process at the time of the wireless rewrite request occurrence, and returns to the state transition management process of the second state. The microcomputer 30 exclusively controls the wired rewrite session and the wireless rewrite session by executing the rewrite exclusive process at the time of the wireless rewrite request occurrence in such a manner, and prevents the sessions from being simultaneously established.

When returning to the state transition management process of the second state, the microcomputer 30 determines whether it is possible to shift to the wireless rewrite session as a result of the rewrite exclusive process at the time of wireless rewrite request occurrence (S45). When specifying that it is possible to shift to the wireless rewrite session by the rewrite exclusive process at the time of the wireless rewrite request occurrence and determining that it is possible to shift (S45: YES), the microcomputer 30 shifts the second state from the default session to the wireless rewrite session (S46), and executes the wireless rewrite program and starts the wireless rewrite process (S47). The microcomputer 30 determines whether the completion condition of the wireless rewrite process is satisfied (S48). When determining that the completion condition of the wireless rewrite process is satisfied (S48: YES), the microcomputer 30 ends the wireless rewrite process (S49) and shifts the second state from the wireless rewrite session to the default session (S50). The microcomputer 30 ends the wireless rewrite program due to the shift to the default session. Here, the completion condition of the wireless rewrite process is, for example, the case where all the writing of the application program is completed and the integrity verification is executed, or the like.

When specifying that it is not possible to shift to the wireless rewrite session by the rewrite exclusive process at the time of the wireless rewrite request occurrence and determining that it is not possible to shift (S45: NO), the microcomputer 30 does not shift the second state from the default session to the wireless rewrite session. That is, the microcomputer 30 maintains the second state at the default session. When determining that the completion condition of the state transition management is satisfied (S51: YES), the microcomputer 30 ends the state transition management process of the second state.

In the above, it is described that the application execution portion 34 can independently (simultaneously) execute the program related to the wired special process and the program related to the wireless special process. However, as shown in FIG. 20, the wired diagnosis program and the wireless diagnosis program may be set to a common program. The vehicle control program is placed as the first program in the application area. The diagnosis program (wired diagnosis program and the wireless diagnosis program and the wireless rewrite program are placed as the second program in the application area. The wired rewrite program may be placed as the second program in the application area, or placed as the third program in the boot area. The application execution portion 34 simultaneously executes the first program and the second program. That is, the application execution portion 34 controls the vehicle control program and the common diagnosis program so as to simultaneously execute the vehicle control program and the diagnosis program. On the other hand, the application execution portion 34 exclusively controls the execution of each program configuring the second program. That is, only one of the wired diagnosis program, the wireless diagnosis program, the wireless rewrite program, and the wired rewrite program is controlled to operate.

Figure 21:
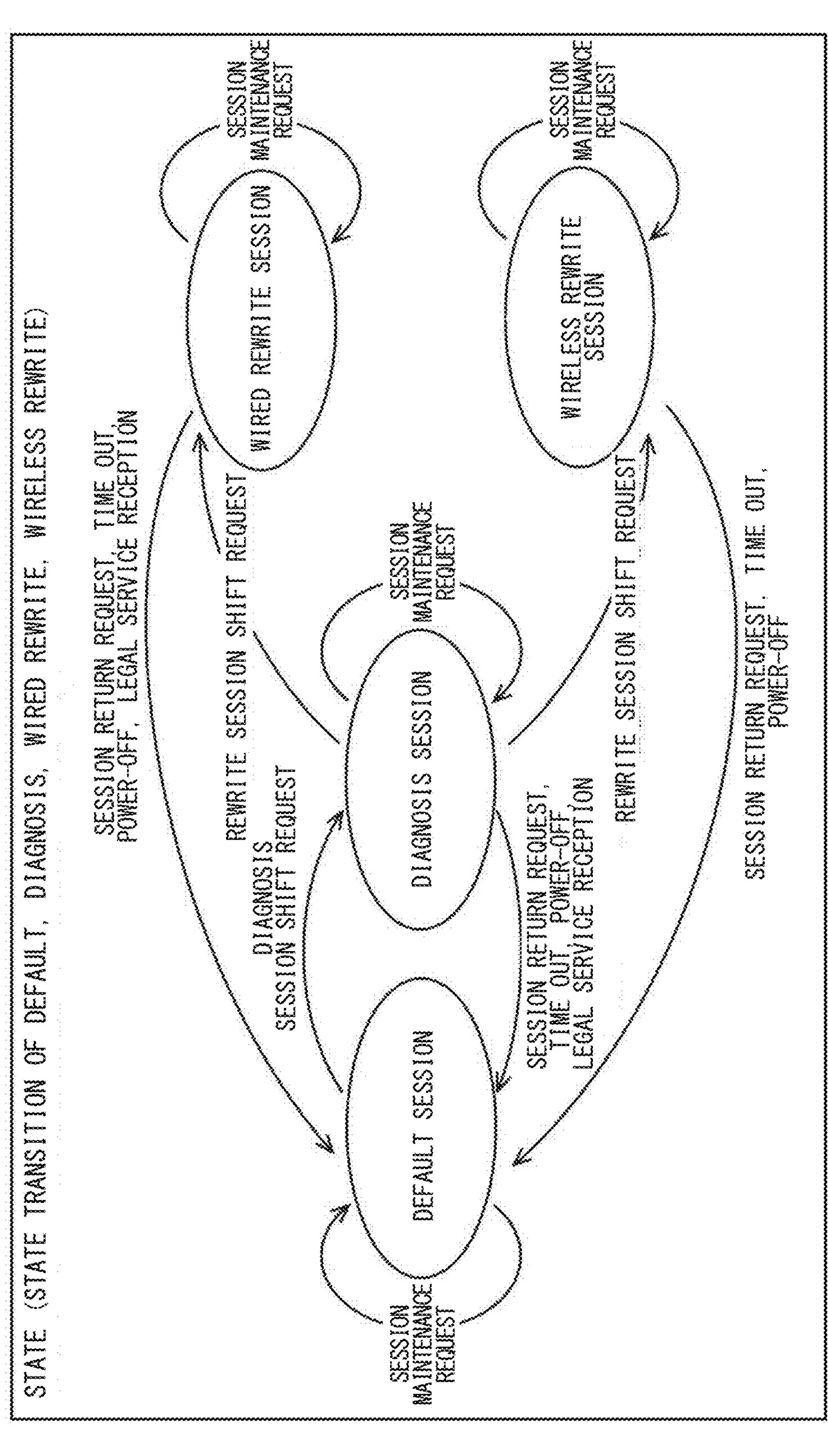
FIG. 21 is a diagram (fourth part) showing the state transition.

As shown in FIG. 21, the application execution portion 34 manages, as states, the default state (default session), the diagnosis state (diagnosis session), the wired rewrite state (wired rewrite session), and the wireless rewrite state (wireless rewrite session) and manages the internal state of the operation. Here, regarding the managed states, the wired state and the wireless state are not independently managed. The wired state and the wireless state are mixed and managed as one state.

Also in this configuration, the application execution portion 34 starts executing the diagnosis program while executing the vehicle control program. The application execution portion 34 starts executing the wireless rewrite program or the wired rewrite program while executing the vehicle control program. On the other hand, the application execution portion 34 exclusively controls the executions of the wireless diagnosis program and the wired diagnosis program. The application execution portion 34 exclusively controls the executions of the wired/wireless diagnosis program and the wired/wireless rewrite program. That is, the application execution portion 34 exclusively controls the execution of each program configuring the second program.

Here, when the wired rewrite program is placed as the third program in the boot area, the application execution portion 34 exclusively controls the executions of the third program and the first and second programs. That is, when executing the wired rewrite program, the application execution portion 34 ends the first program and the second program and operates in the dedicated mode.

As shown in FIG. 21, when the diagnosis request occurs, the application execution portion 34 shifts the session to the diagnosis session while continuing the execution of the vehicle control program, and starts the execution of the diagnosis program. In this state, when the wireless rewrite request occurs, the application execution portion 34 ends the diagnosis program, shifts the current session to the wireless rewrite session, and starts the execution of the wireless rewrite program. The execution of the vehicle control program remains ongoing. On the other hand, when the wired rewrite request occurs, the application execution portion 34 ends the diagnosis program and the vehicle control program, shifts the current session to the wired rewrite session, and starts the execution of the wired rewrite program.

Even in a case where the wireless rewrite program is placed inside the diagnosis program, when the current state transitions from the diagnosis session to the wireless rewrite session during the execution of the vehicle control program and the diagnosis program, the application execution portion 34 interrupts the execution of the vehicle control program and the diagnosis program and thereafter starts the execution of the wireless rewrite program. When the session is not involved, the process can be continued.

In a case where the wired rewrite program is placed outside the diagnosis program, when the current state transitions from the diagnosis session to the wired rewrite session during the execution of the vehicle control program and the diagnosis program, the application execution portion 34 stops the execution of the vehicle control program and the wireless diagnosis program and starts the execution of the wired rewrite program. That is, the application execution portion 34 does not enable simultaneous execution of the vehicle control, the diagnosis of the ECUs 19 to 21 or by wire or wireless, and the wired rewriting of the application program, and enables the execution of only the wired rewriting of the application program.

The embodiment described above may provide effects as below. In the ECUs 19 to 21, the state transition management process of the first state and the state transition management process of the second state are executed. The state transition of each session of the first state and the second state is managed. The default session of the first state or the wired diagnosis session of the first state and the wireless rewrite session of the second state are non-exclusively established (session establishment procedure is performed). In response to the requests for the vehicle control or the diagnosis of the ECUs 19 to 21 and the wireless program rewriting, the vehicle control program or the diagnosis program of the ECUs 19 to 21 and the wireless rewrite program are controlled to be non-exclusively executed. It is possible to perform appropriate arbitration in accordance with various requests from the outside.

In the ECUs 19 to 21, the wired rewrite session and the wireless rewrite session are exclusively established. The wired rewrite program and the wireless rewrite program are controlled to be exclusively executed. It may be possible to appropriately arbitrate the wired program rewriting and the wireless program rewriting.

In the ECUs 19 to 21, when the wired rewrite session priority condition is satisfied, the wired rewrite session is prioritized over the wireless rewrite session. By setting the wired rewrite session priority condition, it may be possible to execute the wired program rewriting with priority over the wireless program rewriting. For example, it may be possible to execute the wired program rewriting instructed by a maintenance person at a dealer or the like with priority over the wireless program rewriting instructed by a vehicle user.

In the ECUs 19 to 21, when the wireless rewrite session priority condition is satisfied, the wireless rewrite session is prioritized over the wired rewrite session. By setting the wireless rewrite session priority condition, it may be possible to execute the wireless program rewriting with priority over the wired program rewriting. For example, it may be possible to execute the wireless program rewriting instructed by a vehicle user with priority over the wired program rewriting instructed by the maintenance person at the dealer or the like.

In the ECUs 19 to 21, when the shifting rewrite session priority condition is satisfied, the shifting rewrite session is prioritized. By setting the shifting rewrite session priority condition, the shifting rewriting can be prioritized and executed. That is, early started one of the wired rewriting or the wireless rewriting can be continued without being interrupted.

In the configuration having two application areas, the vehicle control program, the diagnosis program, and the wireless rewrite program are placed in each application area, and the vehicle control program or the diagnosis program and the wireless rewrite program are executed in parallel (simultaneously). By improving the memory configuration of the flash memory 30*d*, the vehicle control program or the diagnosis program and the wireless rewrite program can be executed in parallel.

When the wireless rewrite request is specified during the execution of the vehicle control program or the wired diagnosis program, the execution of the vehicle control program or the wired diagnosis program is continued and the wireless rewrite program is executed. When the wireless rewrite request occurs during the execution of the vehicle control program or the wired diagnosis program, the vehicle control program or the wired diagnosis program and the wireless rewrite program can be executed in parallel (simultaneously).

When the vehicle control program or the wired diagnosis request is specified during the execution of the wireless rewrite program, the execution of the wireless rewrite program is continued and the vehicle control program or the wired diagnosis program is executed. When the vehicle control request or the wired diagnosis request occurs during the execution of the wireless rewrite program, the wireless rewrite program and the vehicle control program or the wired diagnosis program can be executed in parallel (simultaneously).

When the wired rewrite request is specified during the execution of the vehicle control program or the wireless diagnosis program, the execution of the vehicle control program or the wireless diagnosis program is stopped and the wired rewrite program is executed. When the wired rewrite request occurs during the vehicle control program or the wireless diagnosis program, only the wired rewrite program can be exclusively executed.

In the case of the reprograming firmware embedded type in which the reprograming firmware is embedded, the rewrite program is executed with use of the firmware placed in the application area. It may be possible to execute the rewriting process of the application program in the inactive bank without downloading the reprograming firmware from the outside.

In the case of the reprograming firmware download type in which the reprograming firmware is downloaded from the outside, the rewrite program is executed with use of the firmware downloaded from the outside. It may be possible to execute the rewrite process of the application program in the inactive bank after reducing the capacity of the rewrite program in the application area.

While the present disclosure has been described based on the embodiment, the present disclosure is not limited to the embodiment or structure described herein. The present disclosure encompasses various modifications and variations within the scope of equivalents. Additionally, various combinations and configurations, as well as other combinations and configurations including more, less, or only a single element, are within the scope and spirit of the present disclosure.

The control portion and method described in the present disclosure may be implemented by a special purpose computer which is configured with a memory and a processor programmed to execute one or more particular functions embodied in computer programs of the memory. Alternatively, the control portion described in the present disclosure and the method thereof may be implemented by a dedicated computer configured as a processor with one or more dedicated hardware logic circuits. Alternatively, the control circuit and method described in the present disclosure may be implemented by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

Although the double-bank memory having substantially two application areas has been described, the single-bank suspended memory having two pseudo application areas or the external memory can also be applied.

Although the case of performing difference rewriting of generating the new data from the old data and the difference reprograming data has been described, a case of performing full rewriting of deleting the old data and writing the new data can be applied.

Although the case of rewriting the application program of the ECUs 19 to 21 has been described, also a case of rewriting the application program of the CGW 13 can be applied. That is, the flash memory 26*d* of the CGW 13 may have two memory areas, the configuration of the flash memory 26*d* may be similar to that of the flash memory 30*d* of each of the ECUs 19 to 21, and the microcomputer 26 may have a function similar to that of the microcomputer 30 of each of the ECUs 19 to 21.

The invention claimed is:

1. An electronic control unit comprising:

at least one of (i) a circuit and (ii) a processor with a memory storing computer program code executable by the processor, the at least one of the circuit and the processor configured to cause the electronic control unit to serve as an application execution portion that:

has, as a first state, a first default session, a wired diagnosis session for diagnosing the electronic control unit from an outside of a vehicle, and a wired rewrite session for rewriting the electronic control unit with use of a program acquired from the outside of the vehicle via wired connection, is configured to cause the first state to transition to the wired diagnosis session based on a request indicating a wired diagnosis and cause the first state to transition to the wired rewrite session based on a request indicating a wired rewrite, has, as a second state, a default session and a wireless rewrite session for rewriting the electronic control unit with use of a program acquired from the outside of the vehicle via wireless connection, and is configured to cause the second state to transition to the wireless rewrite session based on a request indicating a wireless rewrite, wherein:

the application execution portion is configured to independently manage the first state and the second state and non-exclusively establish the first default session or the wired diagnosis session and the wireless rewrite session.

2. The electronic control unit according to claim 1, wherein:

the application execution portion has, as the second state, a wireless diagnosis session for diagnosing the electronic control unit from the outside of the vehicle via the wireless and is configured to cause the second state to transition to the wireless diagnosis session based on a request indicating a wireless diagnosis.

3. The electronic control unit according to claim 1, wherein:

the application execution portion is configured to exclusively establish the wired rewrite session and the wireless rewrite session.

4. The electronic control unit according to claim 3, wherein:

the application execution portion is configured to exclusively establish the wired rewrite session with priority over the wireless rewrite session.

5. The electronic control unit according to claim 3, wherein:

the application execution portion is configured to exclusively establish the wireless rewrite session with priority over the wired rewrite session.

6. The electronic control unit according to claim 3, wherein:

the application execution portion is configured to exclusively establish a shifting rewrite session with priority among the wired rewrite session and the wireless rewrite session.

7. An electronic control unit comprising:

at least one of (i) a circuit and (ii) a processor with a memory storing computer program code executable by the processor, the at least one of the circuit and the processor configured to cause the electronic control unit to serve as:

a storage portion that has a plurality of application areas, stores a first program that includes a vehicle control program for performing a vehicle control, a second program that includes a wired diagnosis program for diagnosing the electronic control unit from an outside of a vehicle via a wired connection, and a third program that includes a wireless diagnosis program for diagnosing the electronic control unit from the outside of the vehicle via a wireless connection and a wireless rewrite program for rewriting the electronic control unit with use of a program acquired from the outside of the vehicle via the wireless connection; and an application execution portion configured to control execution of the first program, the second program, and the third program, wherein:

the application execution portion is configured to control the wireless diagnosis program and the wireless rewrite program for exclusively executing the wireless diagnosis program and the wireless rewrite program, and control the first program, the second program, and the third program for non-exclusively executing the first program, the second program, and the third program.

8. The electronic control unit according to claim 7, wherein:

the storage portion stores a fourth program that includes a wired rewrite program for rewriting the electronic control unit with use of a program acquired from the outside of the vehicle via the wire; and the application execution portion is configured to control the third program and the fourth program for exclusively executing the third program and the fourth program.

9. The electronic control unit according to claim 8, wherein the at least one of the circuit and the processor is configured to cause the electronic control unit to serve as:

a wired rewrite request specifying portion configured to specify a wired rewrite request for rewriting the electronic control unit with use of the program acquired from the outside of the vehicle via the wire, wherein:

when the wired rewrite request specifying portion specifies the wired rewrite request, the application execution portion stops the execution of the first program, the second program, and the third program and executes the fourth program.

10. The electronic control unit according to claim 8, wherein:

the first program, the second program, the third program are stored in each of the plurality of application areas of the storage portion and are rewritable; and the fourth program is stored in the storage portion and is not rewritable.

11. An electronic control unit comprising:

at least one of (i) a circuit and (ii) a processor with a memory storing computer program code executable by the processor, the at least one of the circuit and the processor configured to cause the electronic control unit to serve as:

a storage portion that has a plurality of application areas, stores a first program that includes a vehicle control program for performing a vehicle control, a second program that includes a wired diagnosis program for diagnosing the electronic control unit from an outside of a vehicle via a wired connection, a wireless diagnosis program for diagnosing the electronic control unit from the outside of the vehicle via a wireless connection, and a wireless rewrite program for rewriting the electronic control unit with use of a program acquired from the outside of the vehicle via the wireless connection; and an application execution portion configured to control execution of the first program and the second program, wherein:

the application execution portion is configured to control the wired diagnosis program, the wireless diagnosis program, and the wireless rewrite program for exclusively executing the wired diagnosis program, the wireless diagnosis program, and the wireless rewrite program, and control the first program and the second program for non-exclusively executing the first program and the second program.

12. The electronic control unit according to claim 11, wherein:

the storage portion stores a third program that includes a wired rewrite program for rewriting the electronic control unit with use of a program acquired from the outside of the vehicle via the wired connection; and the application execution portion is configured to control the second program and the third program for exclusively executing the second program and the third program.

13. The electronic control unit according to claim 12, wherein the at least one of the circuit and the processor is further configured to cause the electronic control unit to serve as:

a wired rewrite request specifying portion configured to specify a wired rewrite request for rewriting the electronic control unit with use of the program acquired from the outside of the vehicle via the wire, wherein:

when the wired rewrite request specifying portion specifies the wired rewrite request, the application execution portion stops execution of the first program and the second program, and executes the third program.

14. The electronic control unit according to claim 12, wherein:

the first program and the second program are stored in each of the plurality of application areas of the storage portion and are rewritable; and the third program is stored in the storage portion and is not rewritable.

15. A non-transitory computer readable medium storing a session establishment program comprising instructions configured to, when executed by a processor of an electronic control unit that has, as a first state, a first default session, a wired diagnosis session for diagnosing the electronic control unit from an outside of a vehicle via wired connection, and a wired rewrite session for rewriting the electronic control unit with use of a program acquired from the outside of the vehicle via the wire, is configured to cause the first state to transition to the wired diagnosis session based on a request indicating a wired diagnosis and cause the first state to transition to the wired rewrite session based on a request indicating a wired rewrite, has, as a second state, a second default session and a wireless rewrite session for rewriting the electronic control unit with use of a program acquired from the outside of the vehicle via wireless connection, and is configured to cause the second state to transition to the wireless rewrite session based on a request indicating a wireless rewrite, cause the processor to: independently manage the first state and the second state and execute a session establishment procedure that non-exclusively establishes the first default session or the wired diagnosis session and the wireless rewrite session.

* * * * *